United States Patent
Cao et al.

(10) Patent No.: US 10,830,913 B2
(45) Date of Patent: Nov. 10, 2020

(54) X-RAY DETECTORS CAPABLE OF LIMITING DIFFUSION OF CHARGE CARRIERS

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 109 days.

(21) Appl. No.: 15/737,787

(22) PCT Filed: Oct. 14, 2015

(86) PCT No.: PCT/CN2015/091928
§ 371 (c)(1),
(2) Date: Dec. 19, 2017

(87) PCT Pub. No.: WO2017/063157
PCT Pub. Date: Apr. 20, 2017

(65) Prior Publication Data
US 2019/0004190 A1 Jan. 3, 2019

(51) Int. Cl.
*G01N 23/00* (2006.01)
*G01T 1/24* (2006.01)

(52) U.S. Cl.
CPC .................... *G01T 1/244* (2013.01)

(58) Field of Classification Search
CPC ....... G01T 1/244; G01T 1/241; G01T 1/2985; G01T 1/17; G01T 1/172; G01T 1/24;
(Continued)

(56) References Cited

U.S. PATENT DOCUMENTS 4,926,225 A * 5/1990 Hosack ............. H01L 27/14831
257/225
5,055,900 A * 10/1991 Fossum ............. H01L 27/14831
257/236
(Continued)

FOREIGN PATENT DOCUMENTS

| CN | 1094200 C | 11/2002 |
|---|---|---|
| CN | 1414397 A | 4/2003 |
| CN | 1185233 C | 1/2005 |
| CN | 100335914 C | 9/2007 |
| CN | 201622252 U | 11/2010 |
| TW | 201447956 A | 12/2014 |

(Continued)

*Primary Examiner* — Irakli Kiknadze
(74) *Attorney, Agent, or Firm* — IPro, PLLC

(57) ABSTRACT

An apparatus suitable for detecting X-ray is disclosed. In one example, the apparatus comprises an X-ray absorption layer comprising a pixel and a second pixel, and a layer of material or vacuum extending across a thickness of the X-ray absorption layer and encircling the pixel, wherein the layer of material is configured to prevent a charge carrier in the pixel from moving through the layer of material. In another example, the apparatus comprises an X-ray absorption layer comprising a plurality of columns of a semiconductor configured to absorb X-ray, and a layer of material or vacuum extending across a thickness of the X-ray absorption layer and encircling each of the columns, wherein the layer of material is configured to prevent transfer of a charge carrier between two of the columns.

19 Claims, 24 Drawing Sheets

(58) Field of Classification Search
CPC ........... G01T 1/2928; G01T 1/36; G01T 7/00;
G01T 1/2018; G01T 1/247; G01T 1/16;
G01T 1/2992; G01T 1/243; G01T 1/249;
A61B 6/032; A61B 6/4291; A61B
6/4233; A61B 6/4241; A61B 6/00; A61B
6/03; A61B 6/037; A61B 6/4258; A61B
6/4266; A61B 6/4283; A61B 6/482; A61B
6/42; A61B 6/4035; A61B 6/481; G01V
5/0008; G01N 2223/0566; G01N
2223/607; G01N 2223/611; G01N 23/20;
G01N 23/207; G01N 21/4788; G01N
21/9501; G01N 21/95607; G01N
21/95623; G01N 21/95692; G01N 23/02;
G01N 23/046; G01N 23/04; G01N
23/083; G01N 2223/076; G01N
2223/501; G01N 23/087; H05K 1/181;
H05K 1/182; H01L 27/14659; H01L
27/14603; H01L 27/14687; H01L
27/1463; H01L 27/14601; H01L
27/14665; H01L 27/14694; H01L
27/14658; H01L 31/115; H01L 27/14609;
H01L 27/14623; H01L 27/14663; H01L
27/307; H01L 51/424; H01L 31/02005;
H01L 31/022408; H01L 27/14636; H01L
27/14661; H01L 27/1469; H01L
27/14643; H01L 31/03529; H01L 31/103;
H01L 27/14634; H01L 27/14607; H01L
2223/54426; H01L 2223/54493; H01L
23/544; H01L 27/14612; H01L 27/14638;
H01L 31/1836; H02S 40/44; G01J 1/44;
H04N 5/32; H04N 5/347; H04N 5/378
USPC ............. 378/4, 19, 98.8, 62; 357/24, 30, 35;
250/370.14, 370.08–370.11, 367
See application file for complete search history.

(56) References Cited

U.S. PATENT DOCUMENTS

| | | | |
|---|---|---|---|
| 7,522,698 B2* | 4/2009 | Popescu | A61B 6/032 378/19 |
| 7,535,011 B2* | 5/2009 | Chowdhury | G01T 1/2018 250/370.14 |
| 8,901,697 B2* | 12/2014 | Stenson | H01L 31/103 257/435 |
| 2002/0066860 A1* | 6/2002 | Possin | H01L 27/14687 250/370.08 |
| 2002/0148967 A1* | 10/2002 | Iwanczyk | H01L 27/14658 250/370.11 |
| 2002/0181647 A1* | 12/2002 | Venkataramani | G01T 1/2018 378/19 |
| 2004/0251420 A1* | 12/2004 | Sun | G01T 1/202 250/370.09 |
| 2005/0230627 A1 | 10/2005 | Protic et al. | |
| 2006/0131509 A1* | 6/2006 | Matz | G01T 1/2018 250/370.11 |
| 2006/0289777 A1* | 12/2006 | Li | G01T 1/24 250/370.14 |
| 2008/0245967 A1 | 10/2008 | Van Asselt et al. | |
| 2010/0127180 A1* | 5/2010 | Lifshitz | G01T 1/2002 250/367 |
| 2011/0158381 A1* | 6/2011 | Wu | B29D 11/00596 378/19 |
| 2012/0313196 A1* | 12/2012 | Li | H01L 27/1446 257/429 |
| 2014/0138785 A1* | 5/2014 | Pralle | H01L 27/14645 257/432 |

FOREIGN PATENT DOCUMENTS

| | | |
|---|---|---|
| WO | 2007031886 A2 | 3/2007 |
| WO | 2010004453 A2 | 1/2010 |
| WO | 2014109691 A1 | 7/2014 |

\* cited by examiner

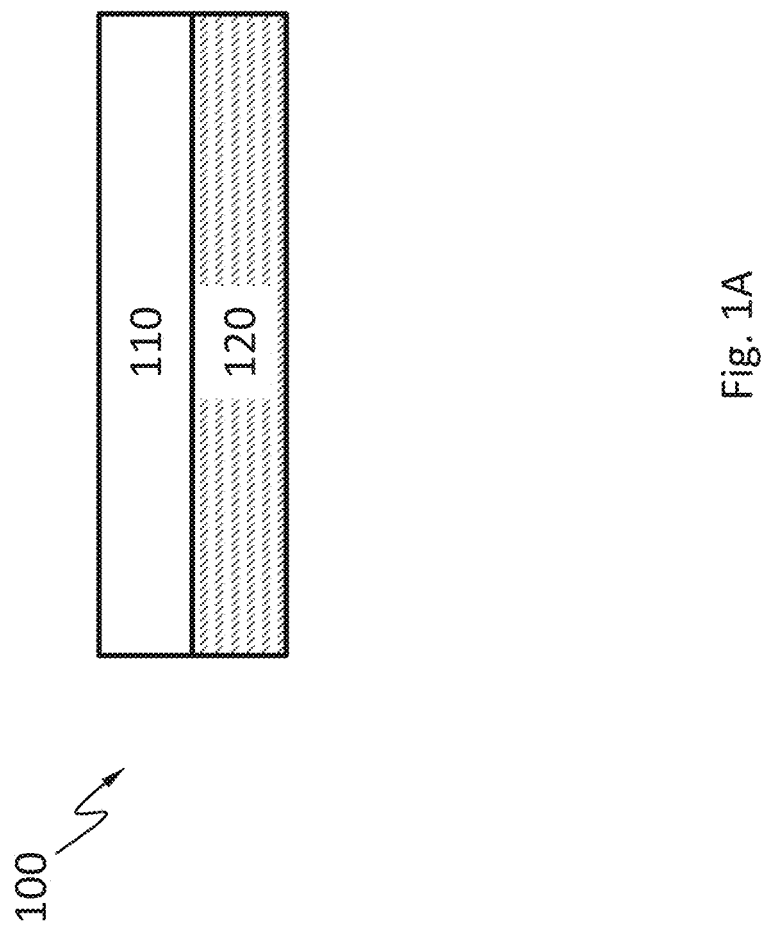

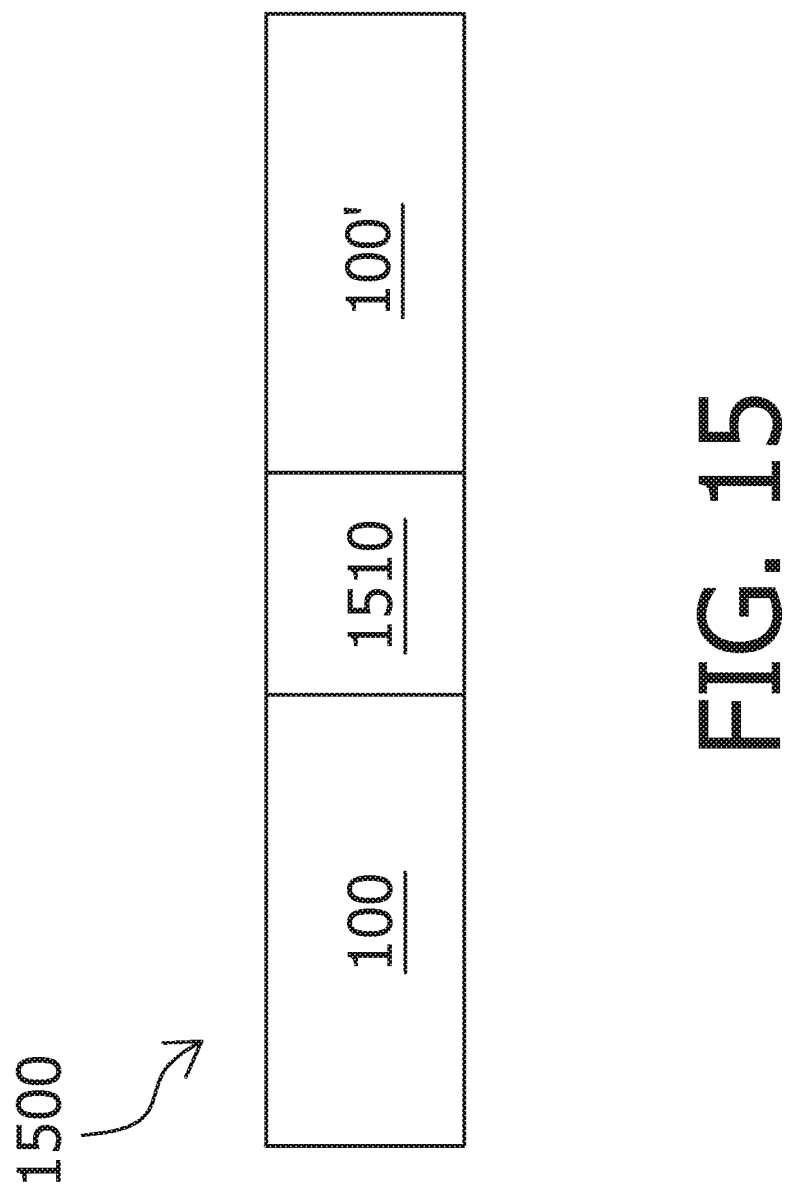

X-RAY DETECTORS CAPABLE OF LIMITING DIFFUSION OF CHARGE CARRIERS

TECHNICAL FIELD

The disclosure herein relates to X-ray detectors, particularly relates to X-ray detectors capable of limiting diffusion of charge carriers.

BACKGROUND

X-ray detectors may be an apparatus used to measure the flux, spatial distribution, spectrum or other properties of X-rays.

X-ray detectors may be used for many applications. One important application is imaging. X-ray imaging is a radiography technique and can be used to reveal the internal structure of a non-uniformly composed and opaque object such as the human body. Another important application is elemental analysis. Elemental analysis is a process where a sample of some material is analyzed for its elemental composition.

Early X-ray detectors include photographic plates and photographic films. A photographic plate may be a glass plate with a coating of light-sensitive emulsion.

In the 1980s, photostimulable phosphor plates (PSP plates) became available. A PSP plate may contain a phosphor material with color centers in its lattice. When the PSP plate is exposed to X-ray, electrons excited by X-ray are trapped in the color centers until they are stimulated by a laser beam scanning over the plate surface. As the plate is scanned by laser, trapped excited electrons give off light, which is collected by a photomultiplier tube. The collected light is converted into a digital image.

Another kind of X-ray detectors are X-ray image intensifiers. In an X-ray image intensifier, X-ray first hits an input phosphor (e.g., cesium iodide) and is converted to visible light. The visible light then hits a photocathode (e.g., a thin metal layer containing cesium and antimony compounds) and causes emission of electrons. The number of emitted electrons is proportional to the intensity of the incident X-ray. The emitted electrons are projected, through electron optics, onto an output phosphor and cause the output phosphor to produce a visible-light image.

Scintillators operate somewhat similarly to X-ray image intensifiers in that scintillators (e.g., sodium iodide) absorb X-ray and emit visible light, which can then be detected by a suitable image sensor for visible light.

Semiconductor X-ray detectors can directly convert X-ray into electric signals and thus offer better performance than previous generations of X-ray detectors. A semiconductor X-ray detector may include a semiconductor layer that absorbs X-ray in wavelengths of interest. When an X-ray photon is absorbed in the semiconductor layer, multiple charge carriers (e.g., electrons and holes) are generated. As used herein, the term "charge carriers," "charges" and "carriers" are used interchangeably. A semiconductor X-ray detector may have multiple pixels that can independently determine the local intensity of X-ray and X-ray photon energy. The charge carriers generated by an X-ray photon may be swept under an electric field into the pixels. If the charge carriers generated by a single X-ray photon are collected by more than one pixel ("charge sharing"), the performance of the semiconductor X-ray detector may be negatively impacted. In applications (e.g., elemental analysis) where X-ray photon energy is determined, charge sharing is especially problematic for accurate photon energy measurement, because the energy of an X-ray photon is determined by the amount of electric charges it generates. Making the pixels larger in size can reduce the possibility of charge sharing but certain applications such as those demand high spatial resolution call for small pixels.

SUMMARY

The teachings disclosed herein relate to methods, systems, and apparatus for X-ray detection. More particularly, the present teaching relates to methods, systems, and apparatus for X-ray detection with charge sharing management.

In one example, an apparatus suitable for detecting X-ray is disclosed. The apparatus comprises: a pixel, and a layer of material or vacuum extending across a thickness of the X-ray absorption layer and encircling the pixel; wherein the layer of material or vacuum is configured to prevent a charge carrier in the pixel from moving through the layer of material.

According to an embodiment, the material is an electrically insulating material.

According to an embodiment, the material is a gas.

According to an embodiment, the layer of material comprises a heavily doped semiconductor.

According to an embodiment, the apparatus comprises an array of pixels.

Disclosed herein is a system comprising the apparatus described above and an X-ray source. The system is configured for performing X-ray radiography on human chest or abdomen.

Disclosed herein is a system comprising the apparatus described above and an X-ray source. The system is configured for performing X-ray radiography on human mouth.

Disclosed herein is a cargo scanning or non-intrusive inspection (NII) system, comprising the apparatus described above and an X-ray source. The cargo scanning or non-intrusive inspection (NII) system is configured for forming an image based on backscattered X-ray.

Disclosed herein is a cargo scanning or non-intrusive inspection (NII) system, comprising the apparatus described above and an X-ray source. The cargo scanning or non-intrusive inspection (NII) system is configured to form an image using X-ray transmitted through an object inspected.

Disclosed herein is a full-body scanner system comprising the apparatus described above and an X-ray source.

Disclosed herein is an X-ray computed tomography (X-ray CT) system comprising the apparatus described above and an X-ray source.

Disclosed herein is an electron microscope comprising the apparatus described above, an electron source and an electronic optical system.

Disclosed herein is a system comprising the apparatus described above. The system is configured for measuring dose of an X-ray source.

Disclosed herein is a system comprising the apparatus described above. The system is an X-ray telescope, or an X-ray microscopy, or a system configured to perform mammography, industrial defect detection, microradiography, casting inspection, weld inspection, or digital subtraction angiography.

Disclosed herein is a system suitable for phase-contrast X-ray imaging (PCI), the system comprising the apparatus described above; a second X-ray detector; and a spacer, wherein the apparatus and the second X-ray detector are spaced apart by the spacer.

According to an embodiment, the apparatus and the second X-ray detector are configured for respectively capturing an image of an object simultaneously.

According to an embodiment, the second X-ray detector is identical to the apparatus.

Disclosed herein is a system suitable for phase-contrast X-ray imaging (PCI), the system comprising the apparatus described above, wherein the apparatus is configured for moving to and capturing images of an object exposed to incident X-ray at different distances from the object.

In another example, an apparatus suitable for detecting X-ray is disclosed. The apparatus comprises: an X-ray absorption layer comprising a plurality of columns of a semiconductor configured to absorb X-ray, and a layer of material or vacuum extending across a thickness of the X-ray absorption layer and encircling each of the columns; wherein the layer of material or vacuum is configured to prevent transfer of a charge carrier between two of the columns.

According to an embodiment, the material is an electrically insulating material.

According to an embodiment, the material is a gas.

According to an embodiment, the layer of material comprises a heavily doped semiconductor.

According to an embodiment, the apparatus comprises an array of pixels.

Disclosed herein is a system comprising the apparatus described above and an X-ray source. The system is configured for performing X-ray radiography on human chest or abdomen.

Disclosed herein is a system comprising the apparatus described above and an X-ray source. The system is configured for performing X-ray radiography on human mouth.

Disclosed herein is a cargo scanning or non-intrusive inspection (NII) system, comprising the apparatus described above and an X-ray source. The cargo scanning or non-intrusive inspection (NII) system is configured for forming an image based on backscattered X-ray.

Disclosed herein is a cargo scanning or non-intrusive inspection (NII) system, comprising the apparatus described above and an X-ray source. The cargo scanning or non-intrusive inspection (NII) system is configured to form an image using X-ray transmitted through an object inspected.

Disclosed herein is a full-body scanner system comprising the apparatus described above and an X-ray source.

Disclosed herein is an X-ray computed tomography (X-ray CT) system comprising the apparatus described above and an X-ray source.

Disclosed herein is an electron microscope comprising the apparatus described above, an electron source and an electronic optical system.

Disclosed herein is a system comprising the apparatus described above. The system is configured for measuring dose of an X-ray source.

Disclosed herein is a system comprising the apparatus described above. The system is an X-ray telescope, or an X-ray microscopy, or a system configured to perform mammography, industrial defect detection, microradiography, casting inspection, weld inspection, or digital subtraction angiography.

In another example, a method is disclosed. The method comprises: obtaining a semiconductor substrate with a first electrical contact on a first surface and a second electrical contact on a second surface opposite the first surface, the second electrical contact comprising a plurality of discrete portions; and forming a plurality of trenches extending into at least 70% of a thickness of the semiconductor substrate; wherein the plurality of trenches encircle each of the discrete portions.

According to an embodiment, the above method further comprises filling the trenches with a material that is electrically insulating.

According to an embodiment, the above method further comprises evacuating the trenches and sealing the trenches.

According to an embodiment, the above method further comprises forming a heavily doped layer on sidewalls of the trenches.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

FIG. 1A schematically shows a cross-sectional view of the detector, according to an embodiment;

FIG. 15 schematically shows a phase-contrast X-ray imaging (PCI) system, according to an embodiment.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

When an X-ray photon is absorbed in a semiconductor layer of an X-ray detector having an array of pixels, multiple charge carriers (e.g., electrons and holes) are generated and may be swept under an electric field towards circuitry for measuring these charge carriers. The carriers drift along the direction of the electric field and diffuse other directions. The envelope of carrier trajectories can be roughly a conical shape. If the envelope sits on a boundary of two or more pixels of the X-ray detector, charge sharing occurs ("charge sharing" used in the present teachings means charge carriers generated from a single X-ray photon are collected by two or more pixels). Charge sharing may cause inaccurate measurement of an X-ray photon, because the energy of the X-ray photon is determined by the amount of electric charges it generates.

In the present teaching, charge sharing between neighboring pixels is limited by the X-ray detector that is capable of limiting diffusion of charge carriers, so that a single X-ray photon is only collected by a single pixel in the X-ray detector.

FIG. 1A schematically shows a semiconductor X-ray detector 100, according to an embodiment. The semiconductor X-ray detector 100 may include an X-ray absorption layer 110 and an electronics layer 120 (e.g., an ASIC) for processing or analyzing electrical signals incident X-ray generates in the X-ray absorption layer 110. In an embodiment, the semiconductor X-ray detector 100 does not comprise a scintillator. The X-ray absorption layer 110 may include a semiconductor material such as, silicon, germanium, GaAs, CdTe, CdZnTe, or a combination thereof. The semiconductor may have a high mass attenuation coefficient for the X-ray energy of interest.

Figure 1B:
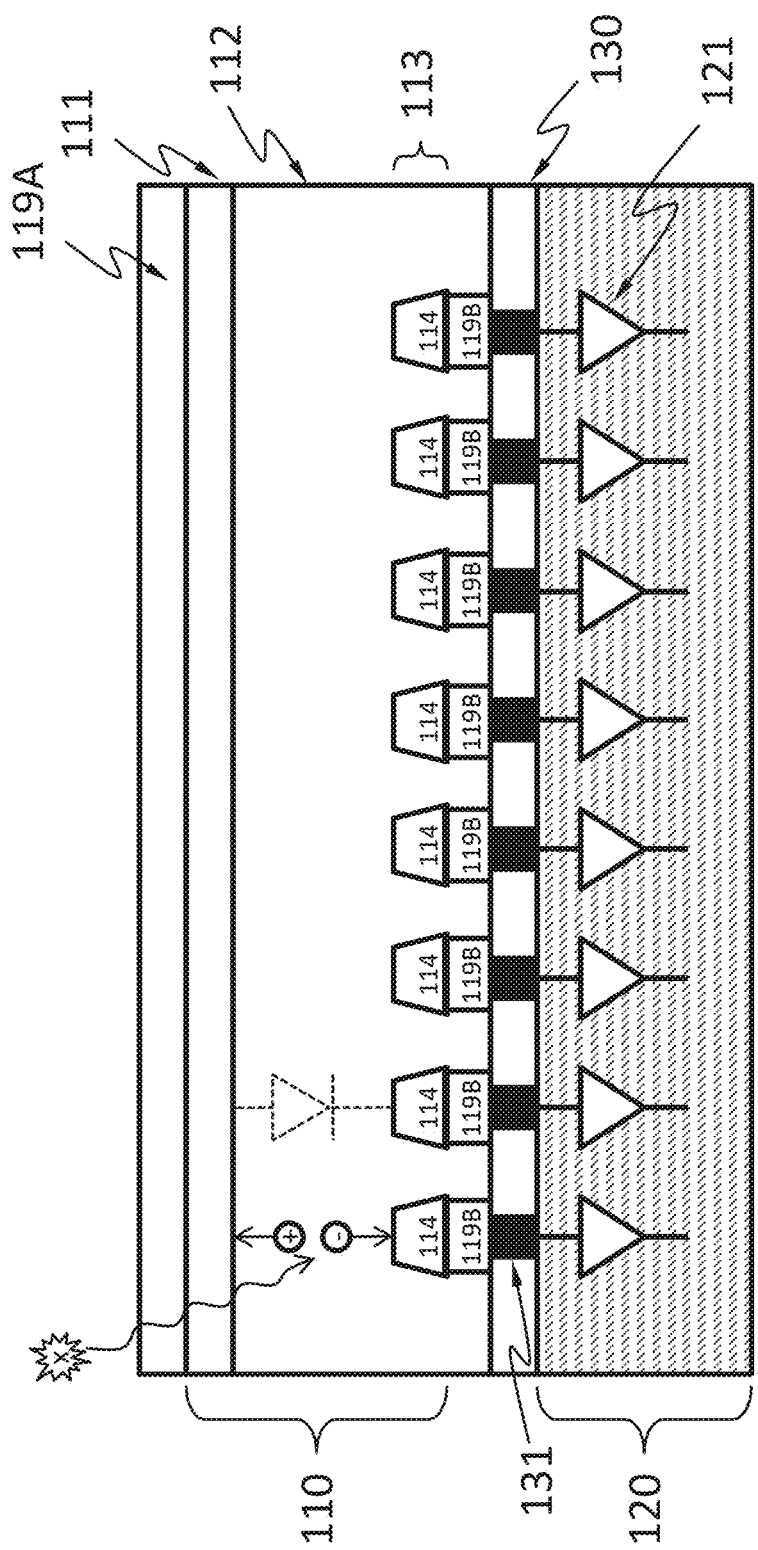
FIG. 1B schematically shows a detailed cross-sectional view of the detector, according to an embodiment.

As shown in a detailed cross-sectional view of the detector 100 in FIG. 1B, according to an embodiment, the X-ray absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete portions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 1B, each of the discrete regions 114 of the second doped region 113 forms a diode with the first doped region 111 and the optional intrinsic region 112. Namely, in the example in FIG. 1B, the X-ray absorption layer 110 has a plurality of diodes having the first doped region 111 as a shared electrode. The first doped region 111 may also have discrete portions.

When an X-ray photon hits the X-ray absorption layer 110 including diodes, the X-ray photon may be absorbed and generate one or more charge carriers by a number of mechanisms. An X-ray photon may generate 10 to 100000 charge carriers. The charge carriers may drift to the electrodes of one of the diodes under an electric field. The field may be an external electric field. The electrical contact 119B may include discrete portions each of which is in electrical contact with the discrete regions 114. In an embodiment, the charge carriers generated by a single X-ray photon can be shared by two different discrete regions 114.

Figure 1C:
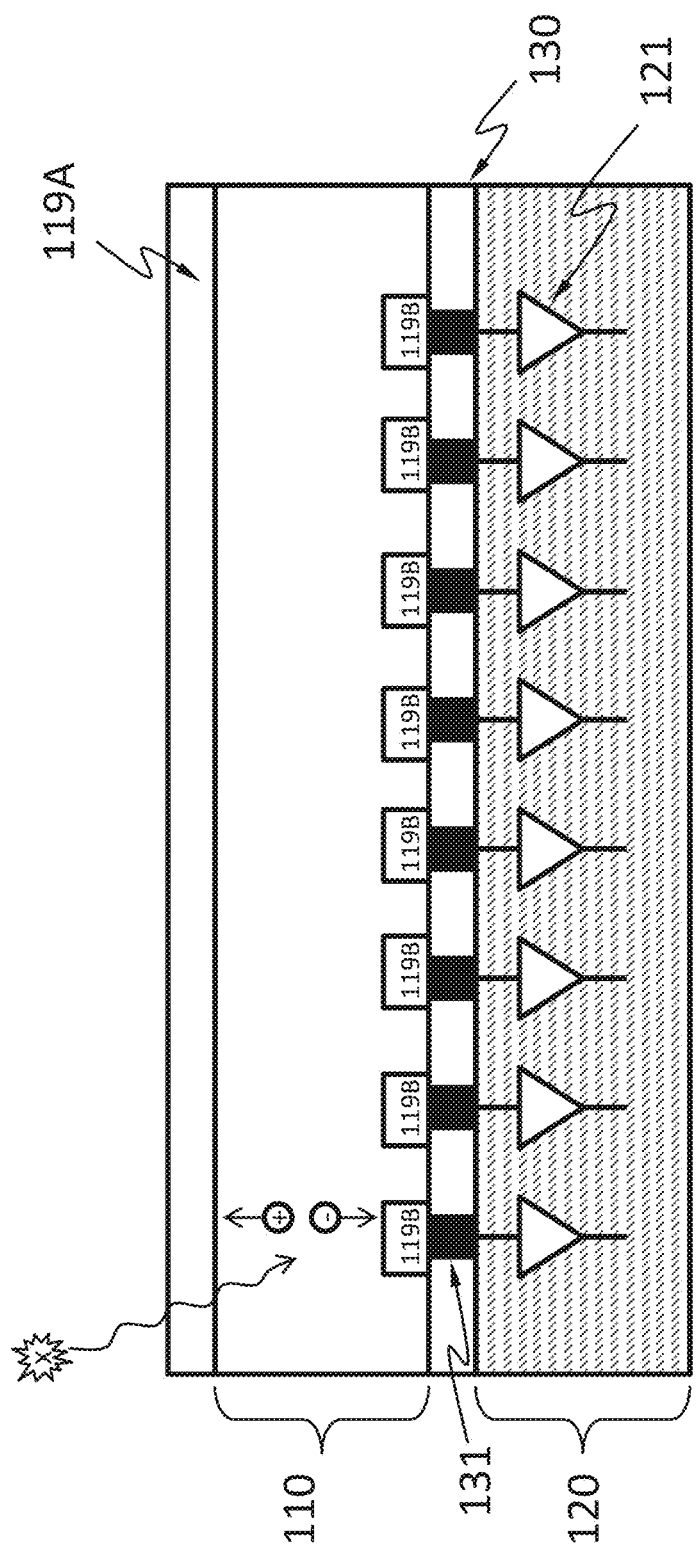
FIG. 1C schematically shows an alternative detailed cross-sectional view of the detector, according to an embodiment.

As shown in an alternative detailed cross-sectional view of the detector 100 in FIG. 1C, according to an embodiment, the X-ray absorption layer 110 may include a resistor of a semiconductor material such as, silicon, germanium, GaAs, CdTe, CdZnTe, or a combination thereof, but does not include a diode. The semiconductor may have a high mass attenuation coefficient for the X-ray energy of interest.

When an X-ray photon hits the X-ray absorption layer 110 including a resistor but not diodes, it may be absorbed and generate one or more charge carriers by a number of mechanisms. An X-ray photon may generate 10 to 100000 charge carriers. The charge carriers may drift to the electrical contacts 119A and 119B under an electric field. The field may be an external electric field. The electrical contact 119B includes discrete portions. In an embodiment, the charge carriers generated by a single X-ray photon can be shared by two different contacts 119B.

The electronics layer 120 may include an electronic system 121 suitable for processing or interpreting signals generated by X-ray photons incident on the X-ray absorption layer 110. The electronic system 121 may include an analog circuitry such as a filter network, amplifiers, integrators, and comparators, or a digital circuitry such as a microprocessors, and memory. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the X-ray absorption layer 110. Other bonding techniques are possible to connect the electronic system 121 to the pixels without using vias.

Figure 2A:
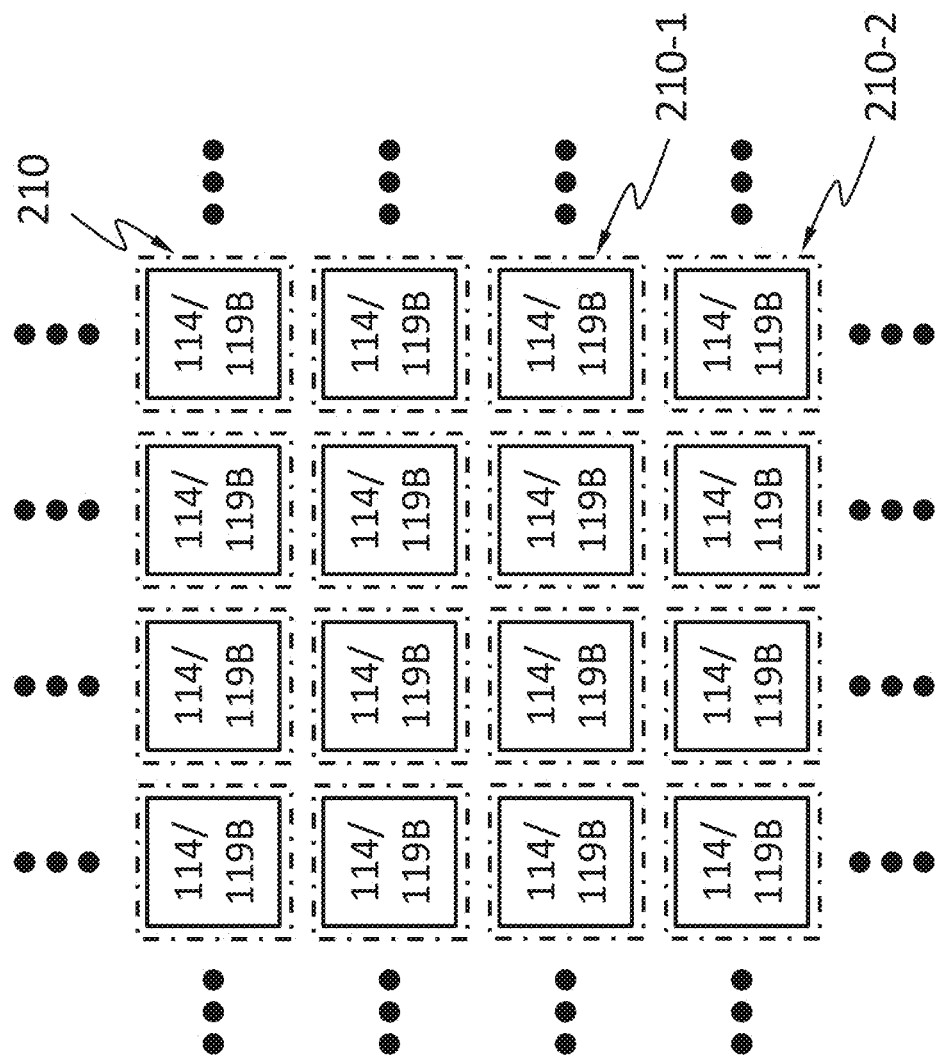
FIG. 2A shows an exemplary top view of a portion of a semiconductor X-ray detector, according to an embodiment.

FIG. 2A shows an exemplary top view of a portion of the apparatus 100 with a 4-by-4 array of discrete regions 114. Charge carriers generated by an X-ray photon incident around the footprint of one of these discrete regions 114 are not substantially shared with another of these discrete regions 114. The area 210 around a discrete region 114 in which substantially all (more than 95%, more than 98% or more than 99% of) charge carriers generated by an X-ray photon incident therein flow to the discrete region 114 is called a pixel associated with that discrete region 114. Namely, less than 5%, less than 2% or less than 1% of these charge carriers flow beyond the pixel, when the X-ray photon hits inside the pixel. The pixels may be organized in any suitable array, such as, a square array, a triangular array and a honeycomb array. The pixels may have any suitable shape, such as, circular, triangular, square, rectangular, and hexangular. The pixels may be individually addressable.

Figure 13:
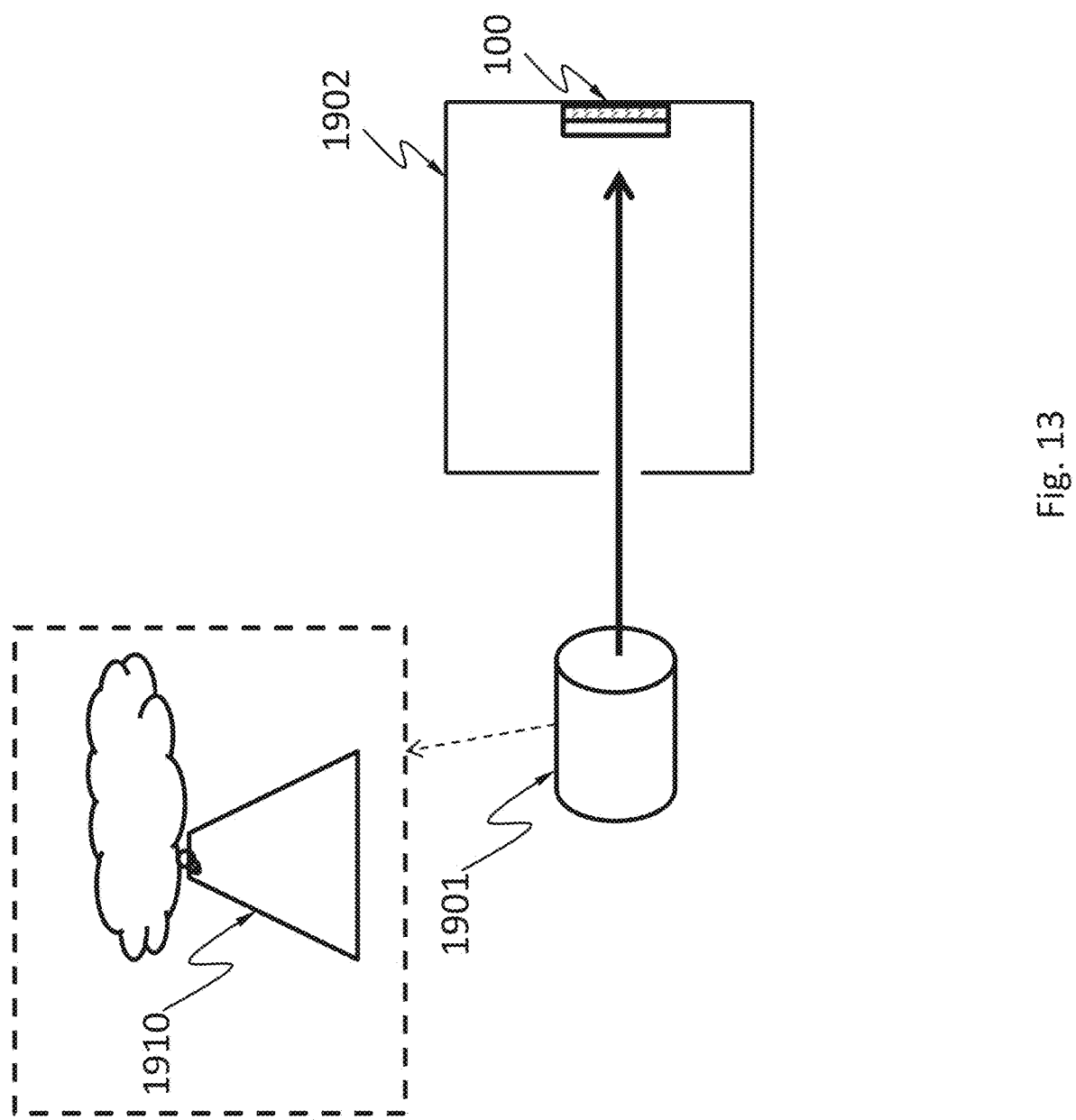
FIG. 13 schematically shows a radiation dose meter, according to an embodiment.

Similarly, when the 4-by-4 array in FIG. 2A indicates an array of discrete portions of the electrical contact 119B in FIG. 13, the charge carriers generated by an X-ray photon incident around the footprint of one of these discrete portions of the electrical contact 119B are not substantially shared with another of these discrete portions of the electrical contact 119B. The area around a discrete portion of the electrical contact 119B in which substantially all (more than 95%, more than 98% or more than 99% of) charge carriers generated by an X-ray photon incident therein flow to the discrete portion of the electrical contact 119B is called a pixel associated with the discrete portion of the electrical contact 119B. Namely, less than 5%, less than 2% or less than 1% of these charge carriers flow beyond the pixel associated with the one discrete portion of the electrical contact 119B, when the X-ray photon hits inside the pixel. The pixels may be organized in any suitable array, such as, a square array, a triangular array and a honeycomb array. The pixels may have any suitable shape, such as, circular, triangular, square, rectangular, and hexangular. The pixels may be individually addressable.

As shown in FIG. 2A, two pixels 210 (e.g. 210-1 and 210-2) associated with two neighboring discrete regions 114 can be called two neighboring pixels ("neighboring pixels" used in the present teaching means pixels that are close to each other such that carriers generated from a single photon may be shared by these pixels).

Figure 2B:
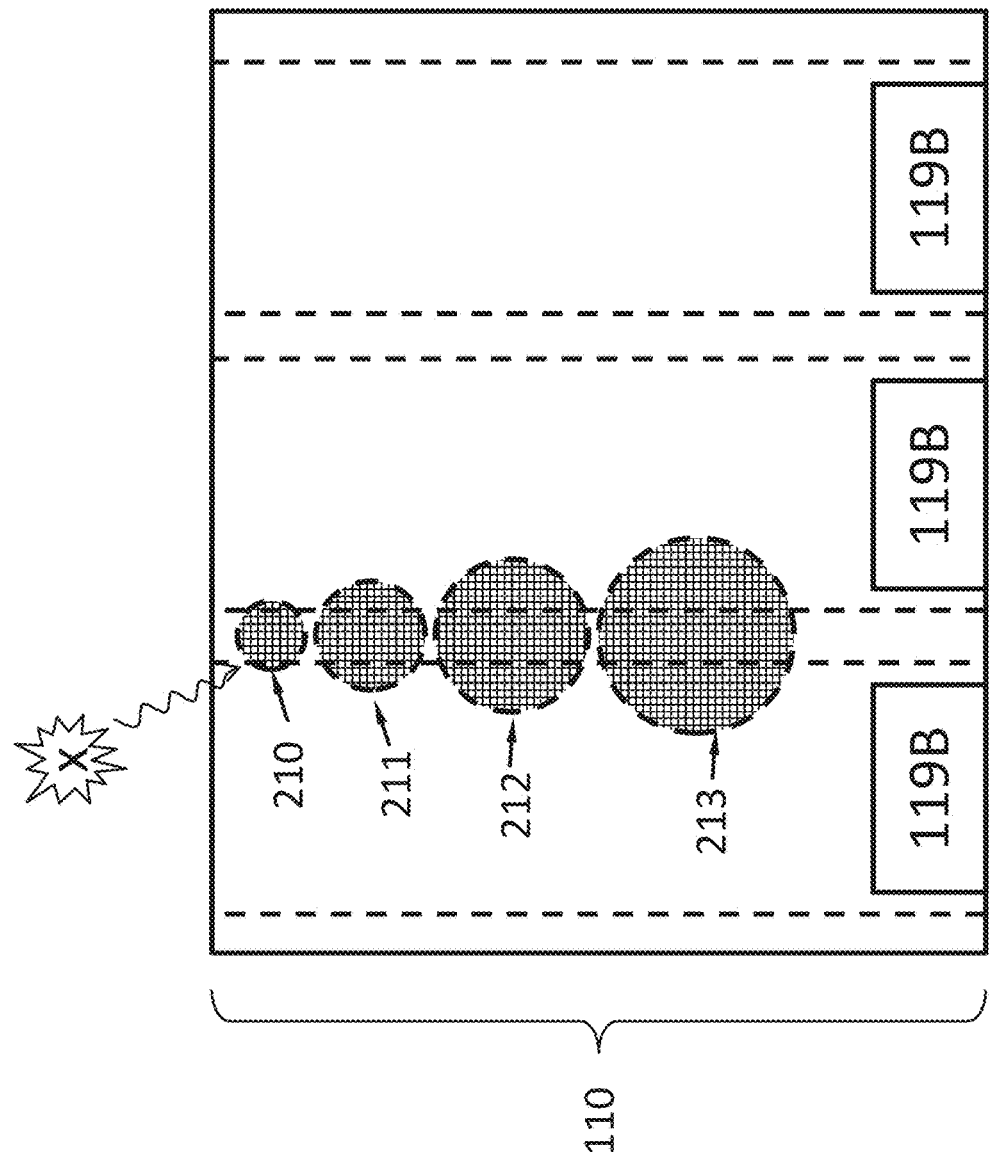
FIG. 2B shows an exemplary cross-sectional view of the detector with dispersing charge carriers according to an embodiment.

FIG. 2B shows an exemplary cross-sectional view of the detector with dispersing charge carriers according to an embodiment. In a semiconductor X-ray detector, charge carriers drift toward the pixels while diffuse in all directions. Regions 210, 211, 212 or 213 schematically show spaces a group of carriers occupy as they drift toward the pixels under an electric field into the pixels.

Figure 2C:
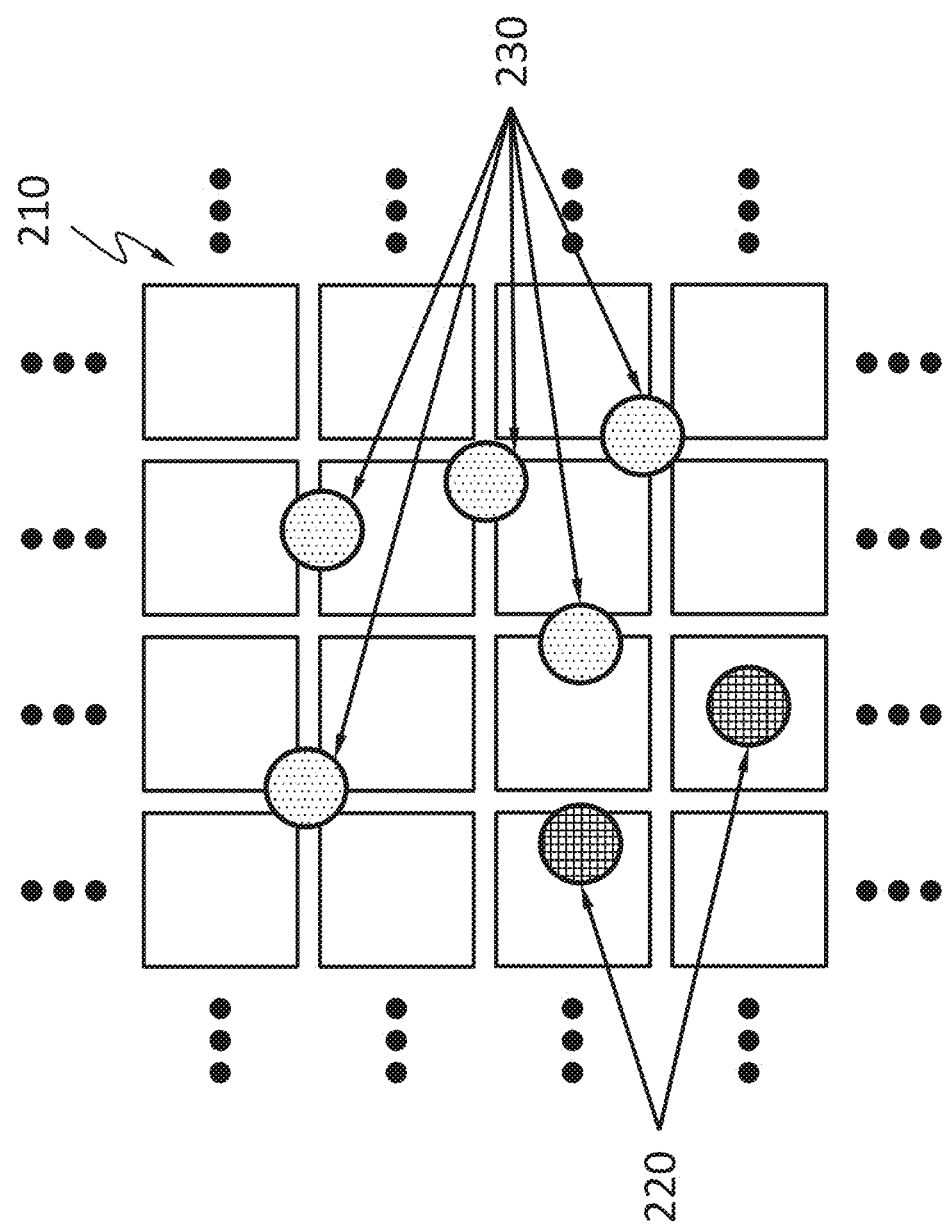
FIG. 2C shows an exemplary array of pixels in a semiconductor X-ray detector, according to an embodiment.

FIG. 2C shows an exemplary array of pixels in a semiconductor X-ray detector, according to an embodiment. When an X-ray photon hits the array, it may be absorbed and cause multiple charge carriers to be generated. The carriers may move in various directions, e.g. drift along the direction of an electric field and diffuse in other directions. In FIG. 2C, each circle (e.g. 220, 230) represents the footprint of a region of charge carriers generated by a photon occupy at a point of time.

As shown in FIG. 2C that illustrates a mechanism of charge sharing, a region the charge carriers occupy may be inside a pixel (e.g. region 220), or on a boundary of neighboring pixels (e.g. region 230).

As discussed above, when a region the charge carriers occupy is on a boundary of two or more neighboring pixels, charge sharing occurs, which may cause issue for energy measurement. In an embodiment, the electronic system 121 in an X-ray detector can still accurately measure the energy of an X-ray photon even if a charge sharing occurs to the carriers generated by the X-ray photon.

According to an embodiment, two neighboring pixels do not have to share a boundary, but can be close to each other such that carriers generated from a single photon may be shared by the two pixels. That is, charge sharing may occur on neighboring pixels, even if there is not a boundary shared by the neighboring pixels.

A size of a pixel can be determined by design, based on fabrication process. As shown in FIG. 2C, the size of each pixel is designed to be the same and enough to cover a transport area when the corresponding photon hits around the center of the pixel. If the size of a pixel is too small, e.g. smaller than a region the charge carriers occupy when the charge carriers reach the pixel, then charge sharing can happen all the time. On the other hand, if the size of a pixel is too large, it is very likely for multiple photons to hit the pixel at the same time, which can generate difficulty for accurate X-ray detection and image generation.

To limit charge sharing, the present teaching discloses a semiconductor X-ray detector that comprises: a pixel, and a layer of material or vacuum extending across a thickness of the X-ray absorption layer and encircling the pixel; wherein the layer of material is configured to prevent a charge carrier in the pixel from moving through the layer of material.

In another example, a semiconductor X-ray detector is disclosed. The semiconductor X-ray detector comprises: an X-ray absorption layer comprising a plurality of columns of a semiconductor configured to absorb X-ray, and a layer of material or vacuum extending across a thickness of the X-ray absorption layer and encircling each of the columns; wherein the layer of material is configured to prevent transfer of a charge carrier between two of the columns.

Figure 3A:
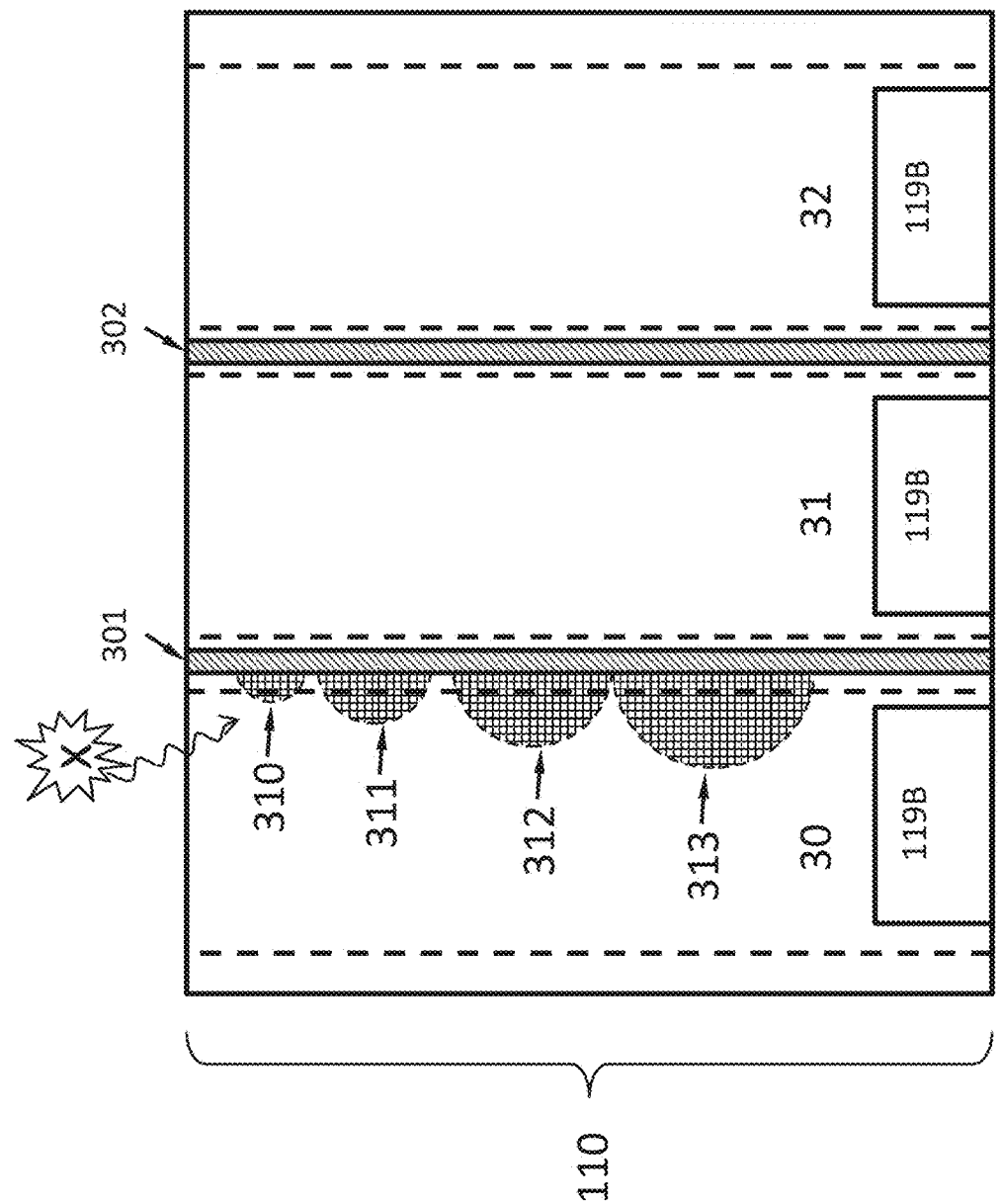
FIG. 3A shows a diagram of neighboring pixels of a semiconductor X-ray detector, according to an embodiment.

FIG. 3A shows a diagram of neighboring pixels 30, 31 and 32 of a semiconductor X-ray detector, according to an embodiment. As shown in FIG. 3A, a layer of material or vacuum 301 or 302 each extends across a thickness of the X-ray absorption layer 110 and encircles the pixels 30 or 31; and the layer of material or vacuum 301 or 302 is configured to prevent a charge carrier in one pixel from moving through the layer of material. As shown in FIG. 3A, when charge carriers generated by an X-ray photon diffuse near the periphery of a pixel 30, as shown in FIG. 3A, the layer of material or vacuum 301 prevents the charge carriers in pixel 30 from entering into a neighboring pixel 31 or another pixel 32 close by, thereby limiting charge sharing. The effect of the layer of material or vacuum 301 is schematically depicted as truncated regions 310, 311, 312 or 313.

Figure 3B:
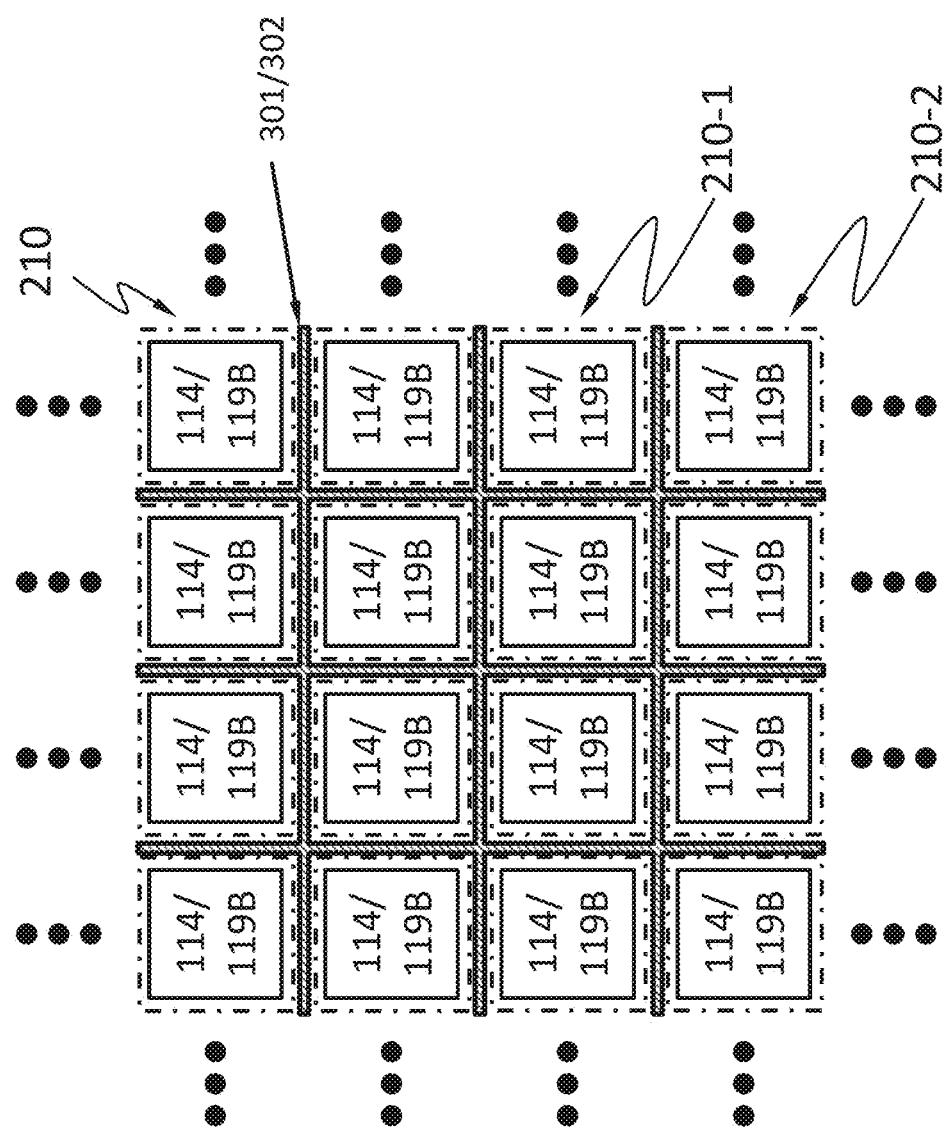
FIG. 3B shows an exemplary top view of a portion of a semiconductor X-ray detector as shown in FIG. 3A.

FIG. 3B shows an exemplary top view of a portion of the semiconductor X-ray detector as shown in FIG. 3A. According to an embodiment, the semiconductor X-ray detector comprises an array of pixels, and the array of pixels are each encircled by a layer of material or vacuum configured to prevent a charge carrier in one pixel from moving through the layer of material to enter into another pixel.

Figure 3C:
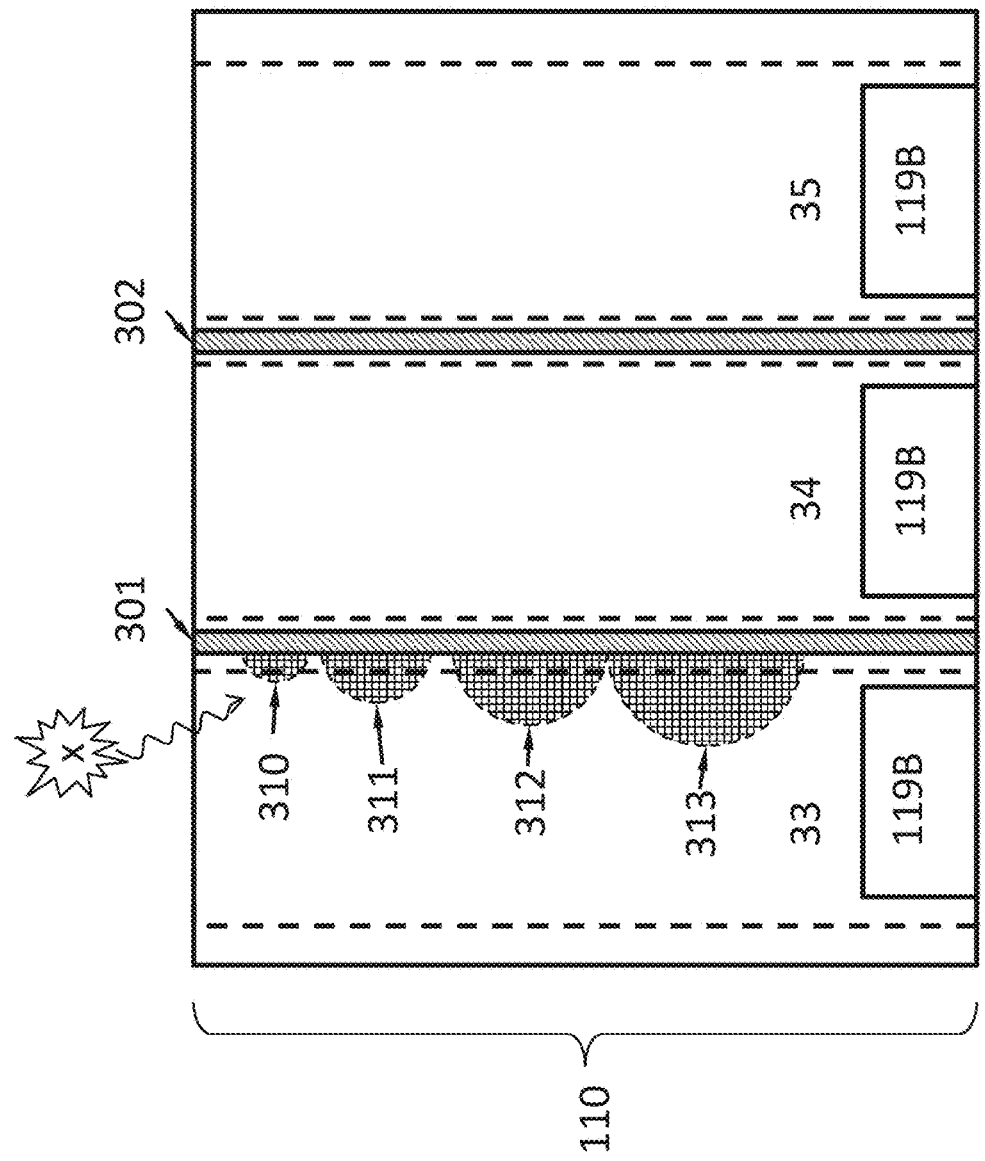
FIG. 3C shows a diagram of neighboring columns of a semiconductor X-ray detector, according to an embodiment.

FIG. 3C shows a diagram of neighboring pixels each comprising a column 33, 34 or 35 of a semiconductor, according to an embodiment. As shown in FIG. 3C, a layer of material or vacuum 301 or 302 each extends across a thickness of the X-ray absorption layer 110 and encircles the columns 33, 34 and 35; and the layer of material or vacuum 301 or 302 is configured to prevent a charge carrier in one column from moving through the layer of material. As shown in FIG. 3A, when charge carriers generated by an X-ray photon diffuse near the periphery of a pixel 30, as shown in FIG. 3A, the layer of material or vacuum 301 prevents the charge carriers in pixel 33 from entering into a neighboring pixel 34 or another pixel 35 close by, thereby limiting charge sharing. The effect of the layer of material or vacuum 301 is schematically depicted as truncated regions 310, 311, 312 or 313.

In FIG. 3A or FIG. 3C, the layer of material or vacuum 301 or 302 encircles a pixel comprising an electrical contact 119B. The layer of material or vacuum 301 or 302 may be on a boundary of two or more neighboring pixels if the two or more neighboring pixels share a boundary. Alternatively, according to an embodiment, two neighboring pixels do not have to share a boundary, but can be close to each other; and a layer of material or vacuum 301 or 302 may each encircle a single pixel.

According to an embodiment, the material is an electrically insulating material. The electrically insulating material may comprise oxide, nitride, glass, polymer, etc.

According to an embodiment, the material is a gas.

Figure 4A:
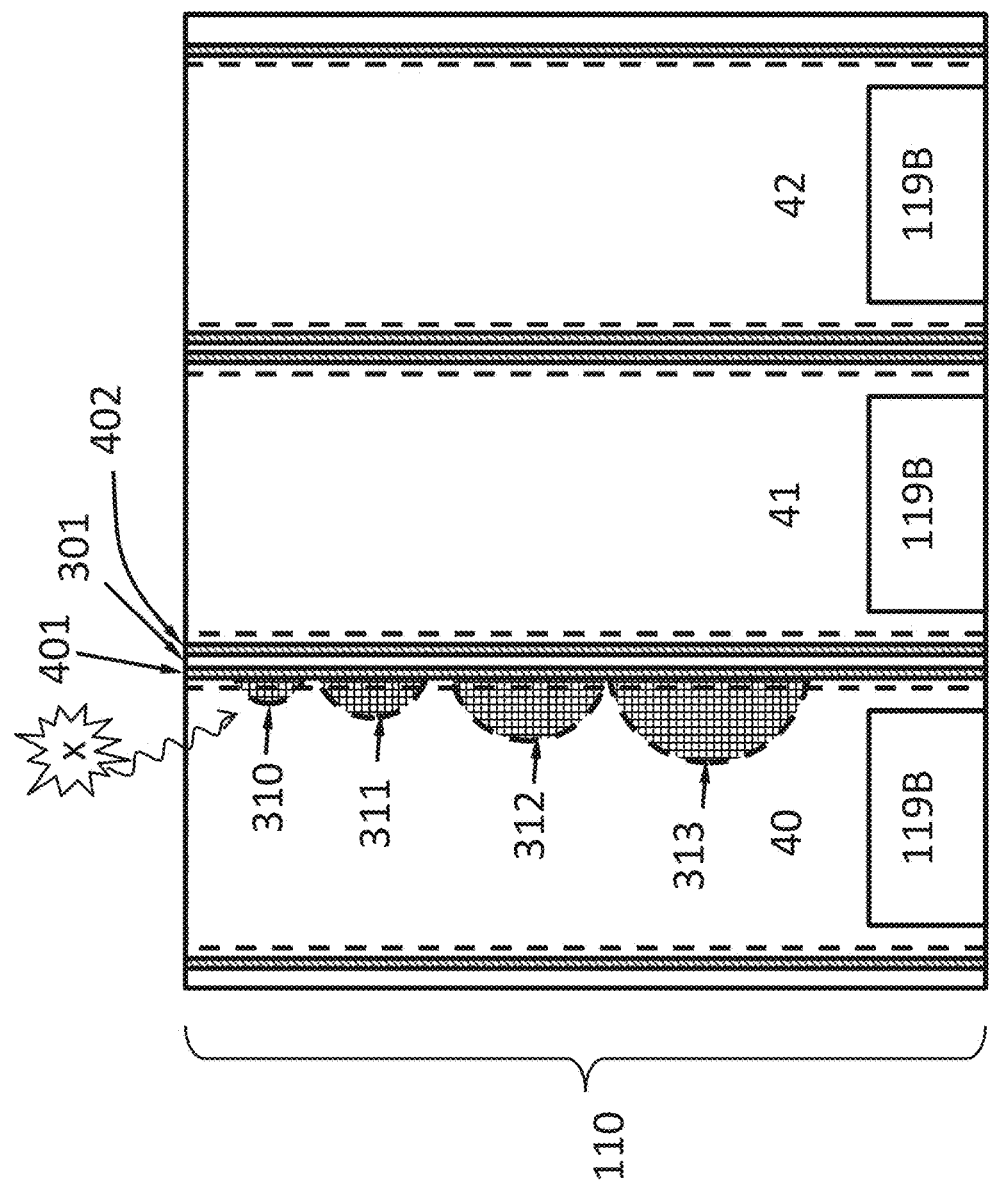
FIG. 4A shows a diagram of neighboring pixels of the semiconductor X-ray detector with sidewall doping, according to an embodiment.
Figure 4B:
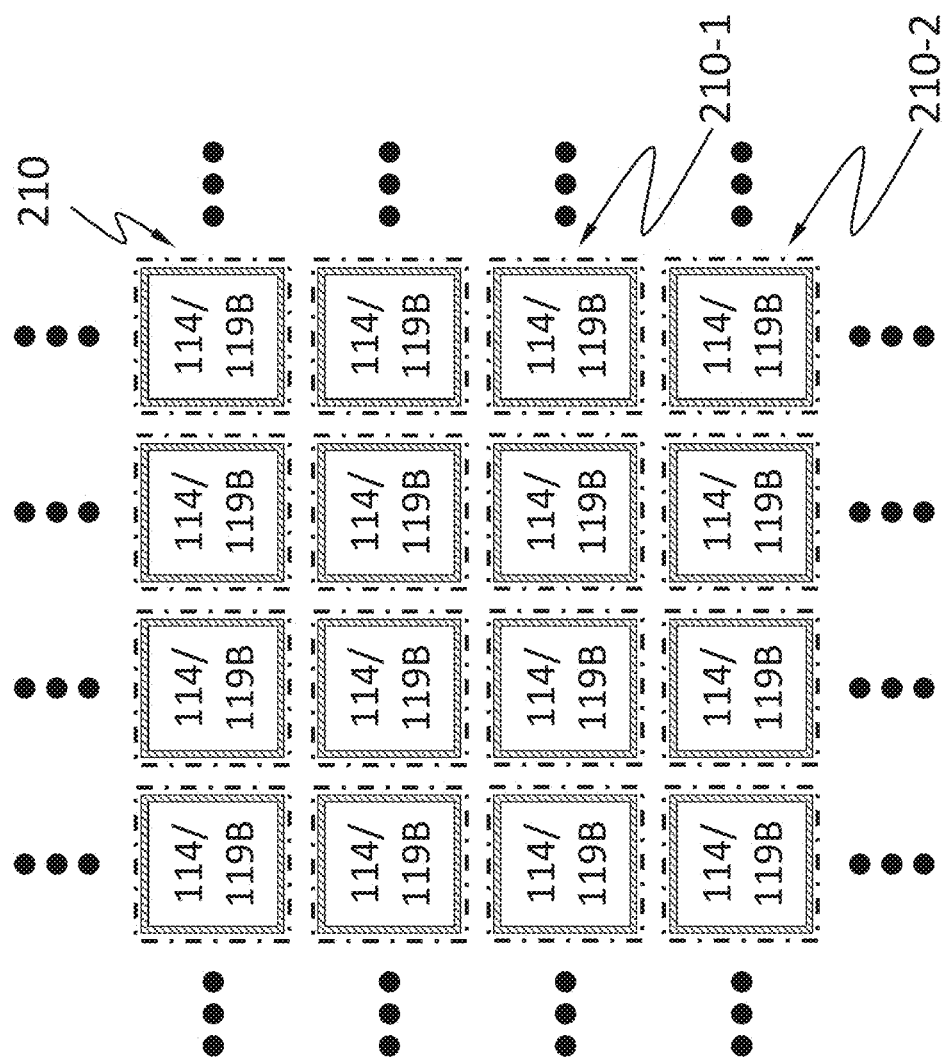
FIG. 4B shows an exemplary top view of a portion of the semiconductor X-ray detector as shown in FIG. 4A.

According to an embodiment, the layer of material may comprise a heavily doped semiconductor. FIG. 4A shows a diagram of neighboring pixels 40, 41 or 42 of the semiconductor X-ray detector with sidewall doping, according to an embodiment; FIG. 4B shows an exemplary top view of a portion of the semiconductor X-ray detector as shown in FIG. 4A. As shown, the sidewalls 401 or 402 of the pixels 40 or 41 may be heavily doped.

Figure 4C:
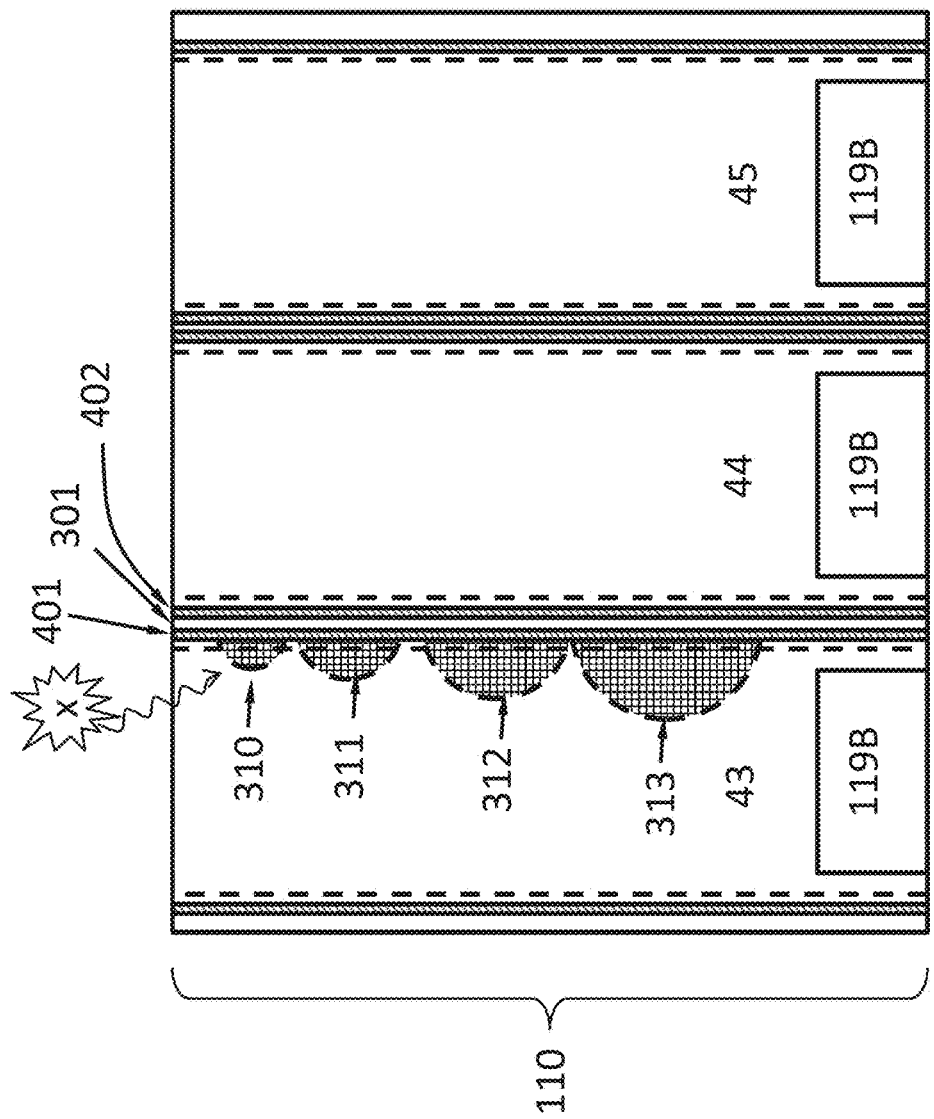
FIG. 4C shows a diagram of neighboring columns of a semiconductor X-ray detector with sidewall doping, according to an embodiment.

FIG. 4C shows a diagram of neighboring pixels comprising columns 43, 44 or 45 of a semiconductor with sidewall doping, according to an embodiment. As shown in FIG. 4C, a layer of material or vacuum 301 or 302 each extends across a thickness of the X-ray absorption layer 110 and encircles the columns 43, 44 and 45. The sidewalk 401 or 402 of the columns 43 or 44 may be heavily doped.

The doped semiconductor sidewalls 401 or 402 may establish an electrical field in the sidewall such that charge carriers from the X-ray photon may be pushed away from the sidewall.

In addition, according to an embodiment, the layer 301 between the sidewalls 401 and 402 may be filled with an electrically insulating material or gas, or 301 may be a vacuum.

In another example, a method for making an X-ray detector is disclosed. The method comprises: obtaining a semiconductor substrate with a first electrical contact on a first surface and a second electrical contact on a second surface opposite the first surface, the second electrical contact comprising a plurality of discrete portions; and forming a plurality of trenches extending (from either the first surface or the second surface) into at least 70% of a thickness of the semiconductor substrate wherein the plurality of trenches encircle each of the discrete portions.

Figure 5A:
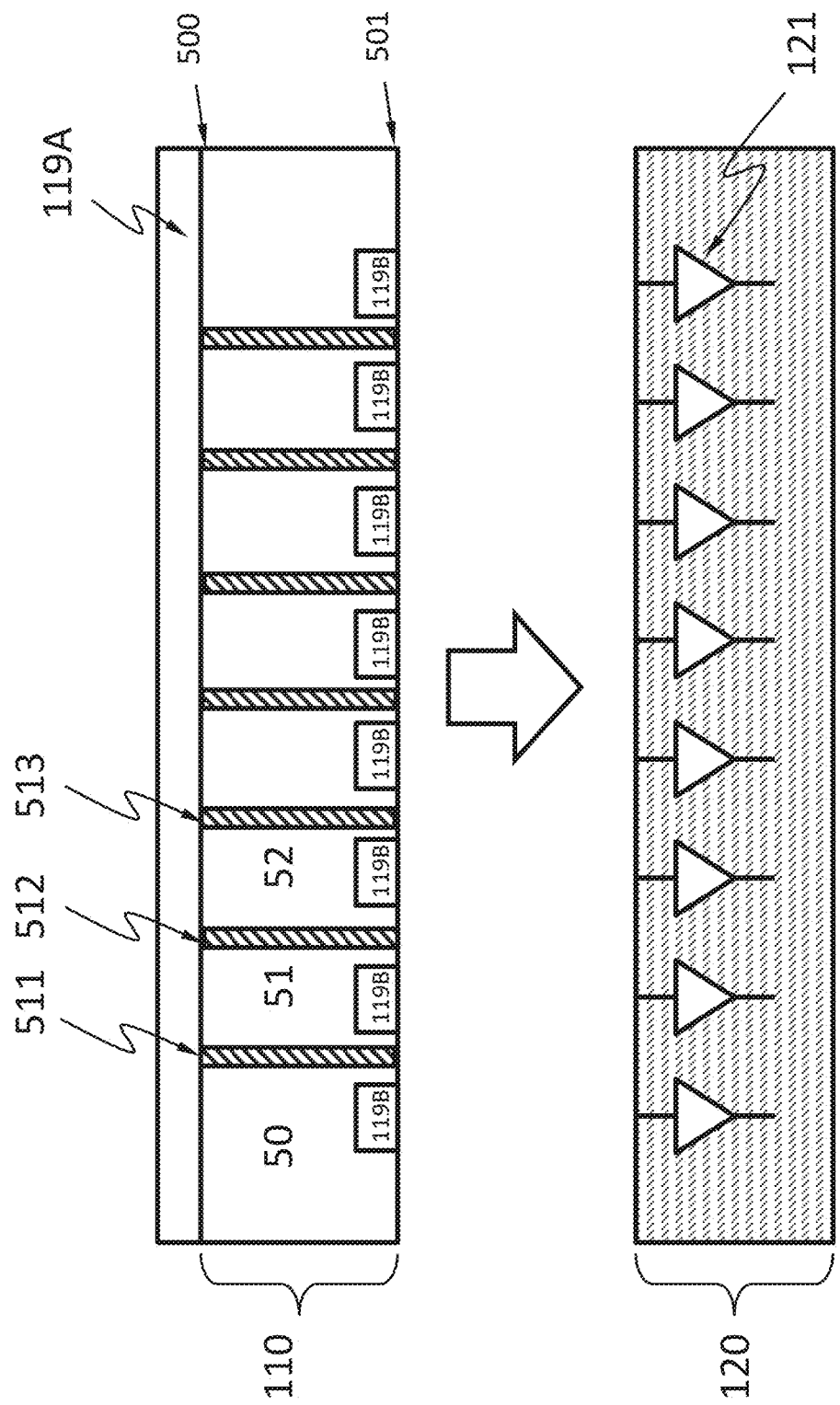
FIG. 5A schematically shows an exemplary method of making a semiconductor X-ray detector, according to an embodiment.

FIG. 5A schematically shows an exemplary method of making a semiconductor X-ray detector by bonding, according to an embodiment. The method comprises: obtaining a semiconductor substrate 110 with a first electrical contact 119A on a first surface 500 and a second electrical contact 1196 on a second surface 501 opposite the first surface, the second electrical contact 119B comprising a plurality of discrete portions 50, 51, 52, etc.; and forming a plurality of trenches 511, 512, 513, etc. extending into at least 70% of a thickness of the semiconductor substrate 110; wherein the plurality of trenches encircle each of the discrete portions. The first semiconductor substrate 110 can be bonded with an electronics layer 120 (e.g., an ASIC) for processing or analyzing electrical signals incident X-ray generates in the X-ray absorption layer 110 before or after the trenches are formed. As discussed, the electronics layer 120 may include an electronic system 121 suitable for processing or interpreting signals generated by X-ray photons incident on the X-ray absorption layer 110.

Figure 5B:
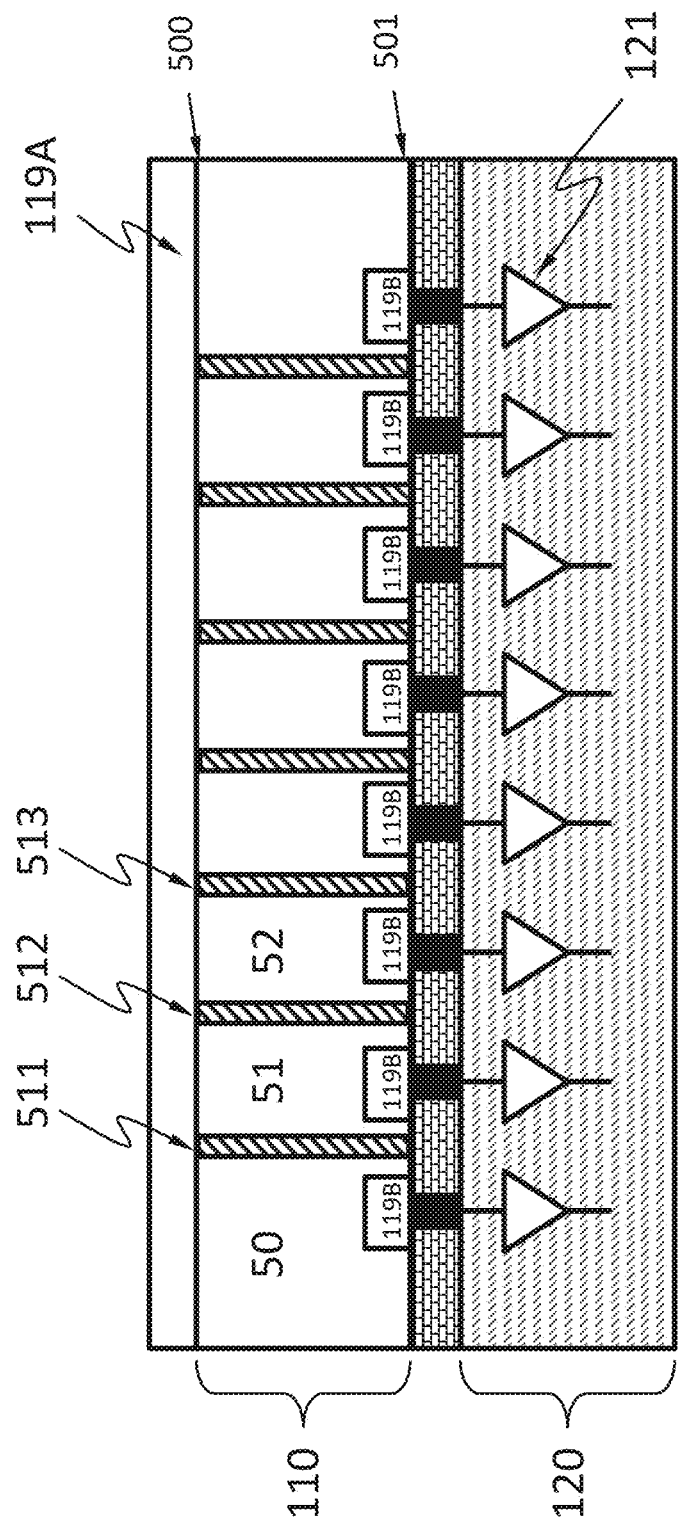
FIG. 5B schematically shows another exemplary method of making a semiconductor X-ray detector, according to an embodiment.

FIG. 5B schematically shows another exemplary method of making a semiconductor X-ray detector by using a single wafer, according to an embodiment. For example, the wafer may be a silicon on insulator (SOI) wafer. An SOI wafer has at least three layers: the device layer, the buried oxide layer and the handle layer. The device layer is a layer of high quality silicon suitable for fabricating electronic circuitry. The handle layer is usually a thicker of silicon of inferior quality. The handle layer provides mechanical strength to the wafer. The buried oxide layer is an oxide layer sandwiched between the device layer and the handle layer and electrically insulates he device layer from the handle layer. According to an embodiment, as shown in FIG. 5B, the X-ray absorption layer 110 may be manufactured in the handle layer of a SOI wafer, while the electronics layer 120 may be manufactured in the device layer of the same SOI wafer.

According to an embodiment, as shown in FIG. 5B, the method comprises: obtaining a semiconductor substrate 110 in a handle layer of a SOI wafer with a first electrical contact 119A on a first surface 500 and a second electrical contact 119B on a second surface 501 opposite the first surface, the second electrical contact 119B comprising a plurality of discrete portions 50, 51, 52, etc.; and forming a plurality of trenches 511, 512, 513, etc. extending into at least 70% of a thickness of the semiconductor substrate 110; wherein the plurality of trenches encircle each of the discrete portions. Within the device layer of the SOI wafer, an electronics layer 120 may be formed (e.g., an ASIC) for processing or analyzing electrical signals incident X-ray generates in the X-ray absorption layer 110. Vias can be formed through the insulator layer between the handling layer and the device to electrically connect the electrical contacts 119B and the electronics layer 120.

According to an embodiment, the above method further comprises filling the trenches with a material that is electrically insulating. As discussed, an electrically insulating material may comprise oxide, nitride, glass, polymer, etc.

According to an embodiment, the above method further comprises evacuating the trenches and sealing the trenches.

According to an embodiment, the above method further comprises forming a heavily doped layer on sidewalls of the trenches.

Various exemplary embodiments of applications of the above X-ray detector are provided below.

Figure 6:
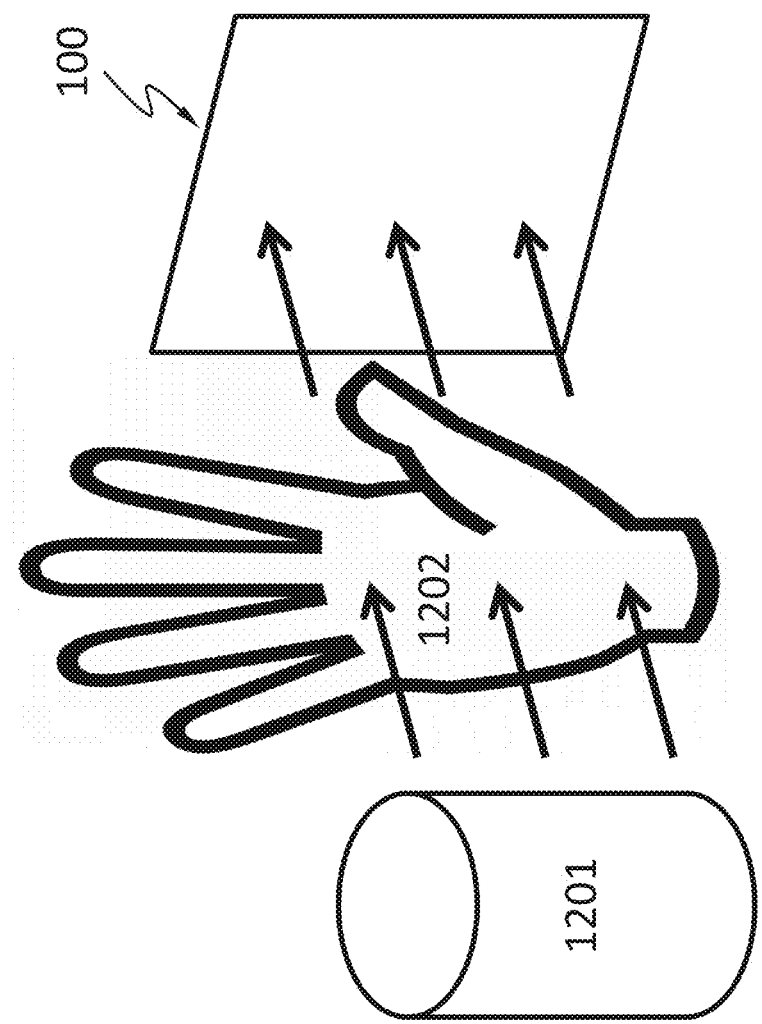
FIG. 6 schematically shows a system comprising the semiconductor X-ray detector described herein, suitable for medical imaging such as chest X-ray radiography, abdominal X-ray radiography, etc., according to an embodiment.

FIG. 6 schematically shows a system comprising the semiconductor X-ray detector 100 described herein. The system may be used for medical imaging such as chest X-ray radiography, abdominal X-ray radiography, etc. The system comprises an X-ray source 1201. X-ray emitted from the X-ray source 1201 penetrates an object 1202 (e.g., a human body part such as chest, limb, abdomen), is attenuated by different degrees by the internal structures of the object 1202 (e.g., bones, muscle, fat and organs, etc.), and is projected to the semiconductor X-ray detector 100. The semiconductor X-ray detector 100 forms an image by detecting the intensity distribution of the X-ray.

Figure 7:
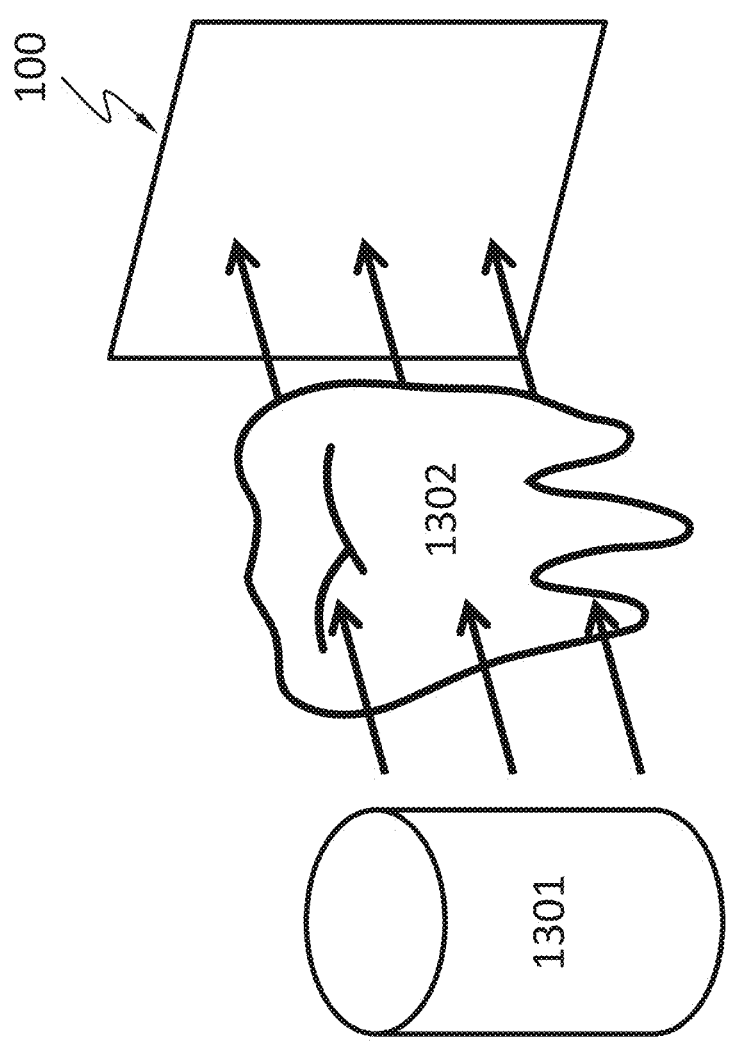
FIG. 7 schematically shows a system comprising the semiconductor X-ray detector described herein suitable for dental X-ray radiography, according to an embodiment.

FIG. 7 schematically shows a system comprising the semiconductor X-ray detector 100 described herein. The system may be used for medical imaging such as dental X-ray radiography. The system comprises an X-ray source 1301. X-ray emitted from the X-ray source 1301 penetrates an object 1302 that is part of a mammal (e.g., human) mouth. The object 1302 may include a maxilla bone, a palate bone, a tooth, the mandible, or the tongue. The X-ray is attenuated by different degrees by the different structures of the object 1302 and is projected to the semiconductor X-ray detector 100. The semiconductor X-ray detector 100 forms an image by detecting the intensity distribution of the X-ray. Teeth absorb X-ray more than dental caries, infections, periodontal ligament. The dosage of X-ray radiation received by a dental patient is typically small (around 0.150 mSv for a full mouth series)

Figure 8:
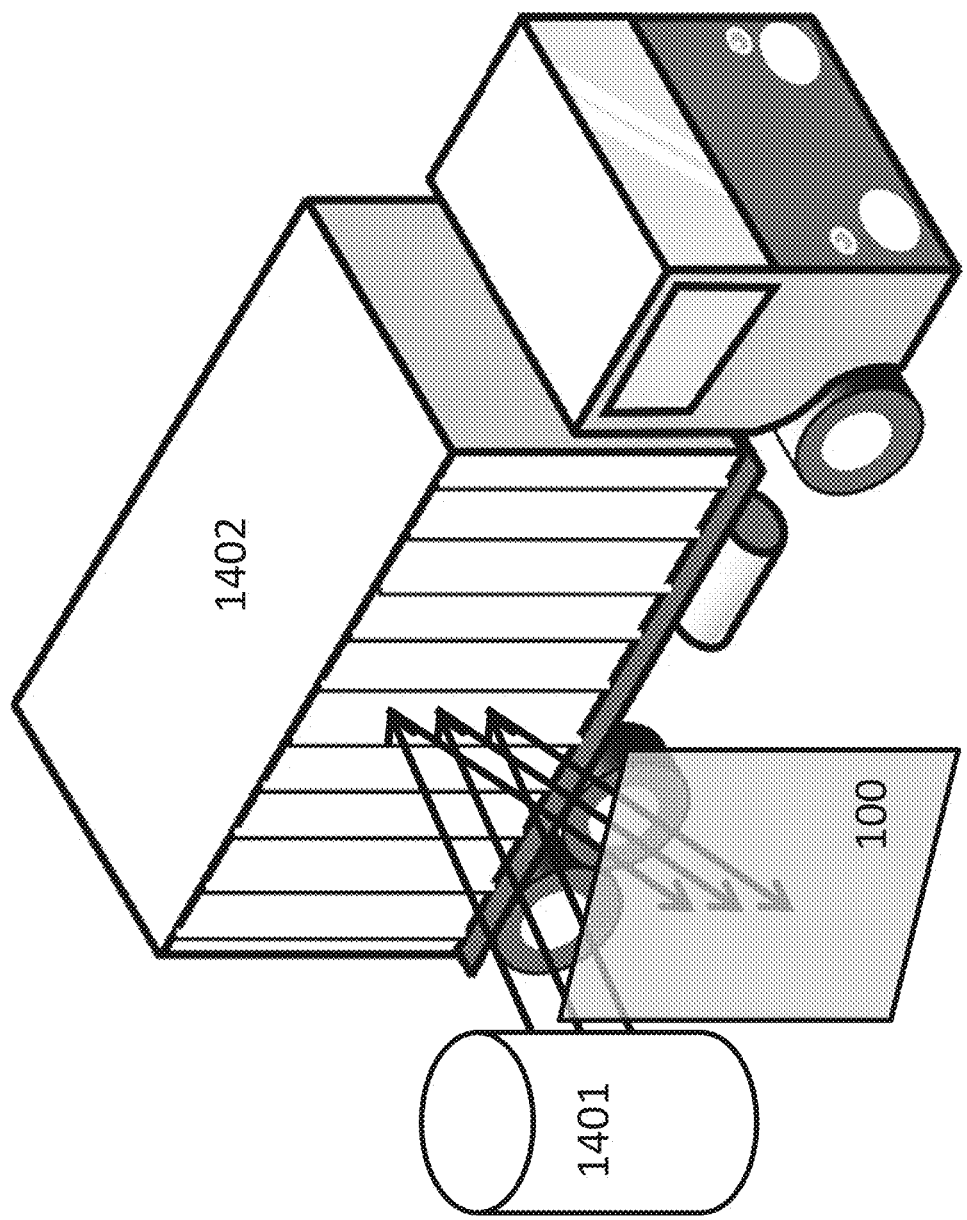
FIG. 8 schematically shows a cargo scanning or non-intrusive inspection (NII) system comprising the semiconductor X-ray detector described herein, according to an embodiment.

FIG. 8 schematically shows a cargo scanning or non-intrusive inspection (NII) system comprising the semiconductor X-ray detector 100 described herein. The system may be used for inspecting and identifying goods in transportation systems such as shipping containers, vehicles, ships, luggage, etc. The system comprises an X-ray source 1401. X-ray emitted from the X-ray source 1401 may backscatter from an object 1402 (e.g., shipping containers, vehicles, ships, etc.) and be projected to the semiconductor X-ray detector 100. Different internal structures of the object 1402 may backscatter X-ray differently. The semiconductor X-ray detector 100 forms an image by detecting the intensity distribution of the backscattered X-ray and/or energies of the backscattered X-ray photons.

Figure 9:
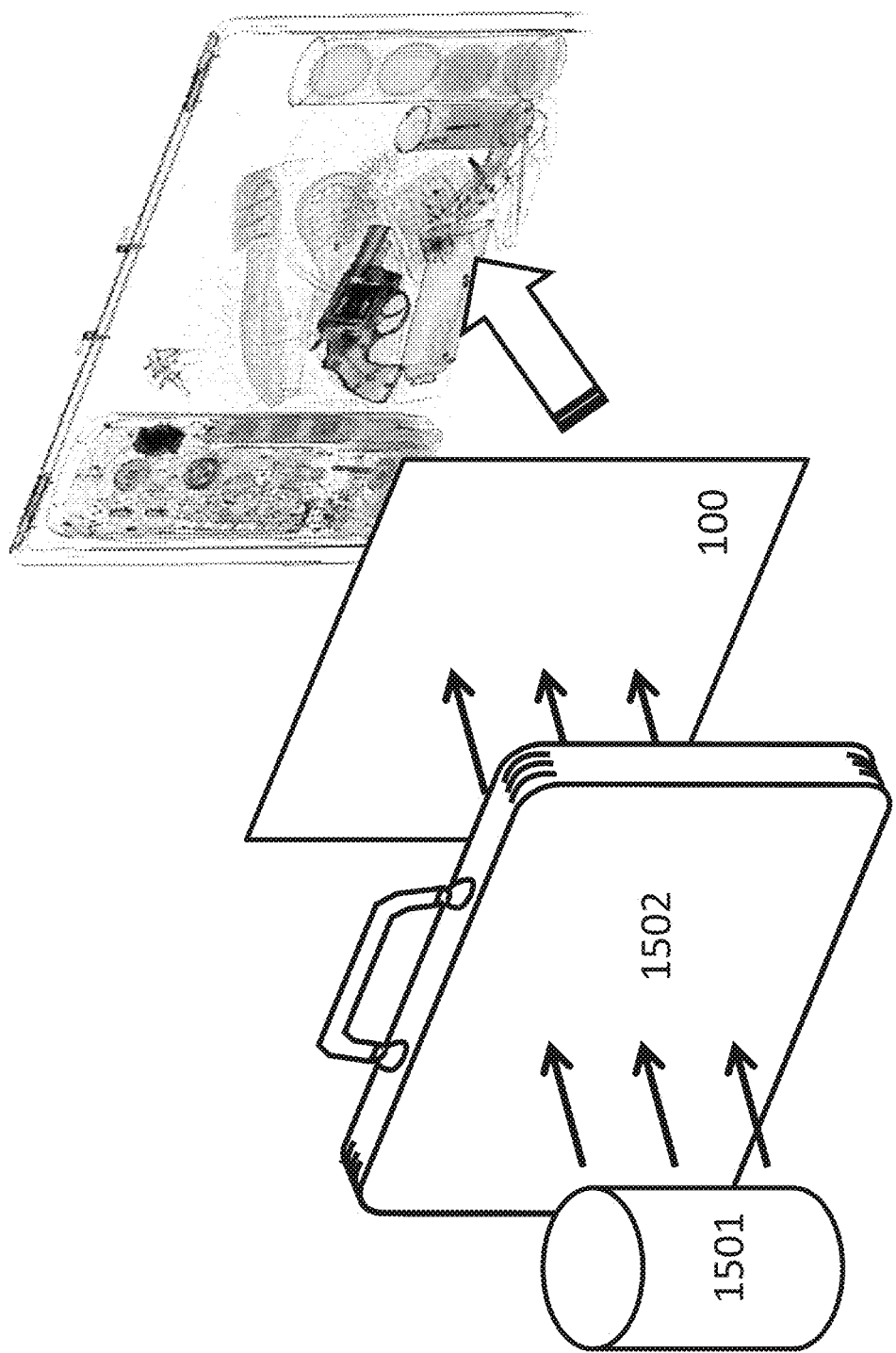
FIG. 9 schematically shows another cargo scanning or non-intrusive inspection (NII) system comprising the semiconductor X-ray detector described herein, according to an embodiment.

FIG. 9 schematically shows another cargo scanning or non-intrusive inspection (NII) system comprising the semiconductor X-ray detector 100 described herein. The system may be used for luggage screening at public transportation stations and airports. The system comprises an X-ray source 1501. X-ray emitted from the X-ray source 1501 may penetrate a piece of luggage 1502, be differently attenuated by the contents of the luggage, and projected to the semiconductor X-ray detector 100. The semiconductor X-ray detector 100 forms an image by detecting the intensity distribution of the transmitted X-ray. The system may reveal contents of luggage and identify items forbidden on public transportation, such as firearms, narcotics, edged weapons, flammables.

Figure 10:
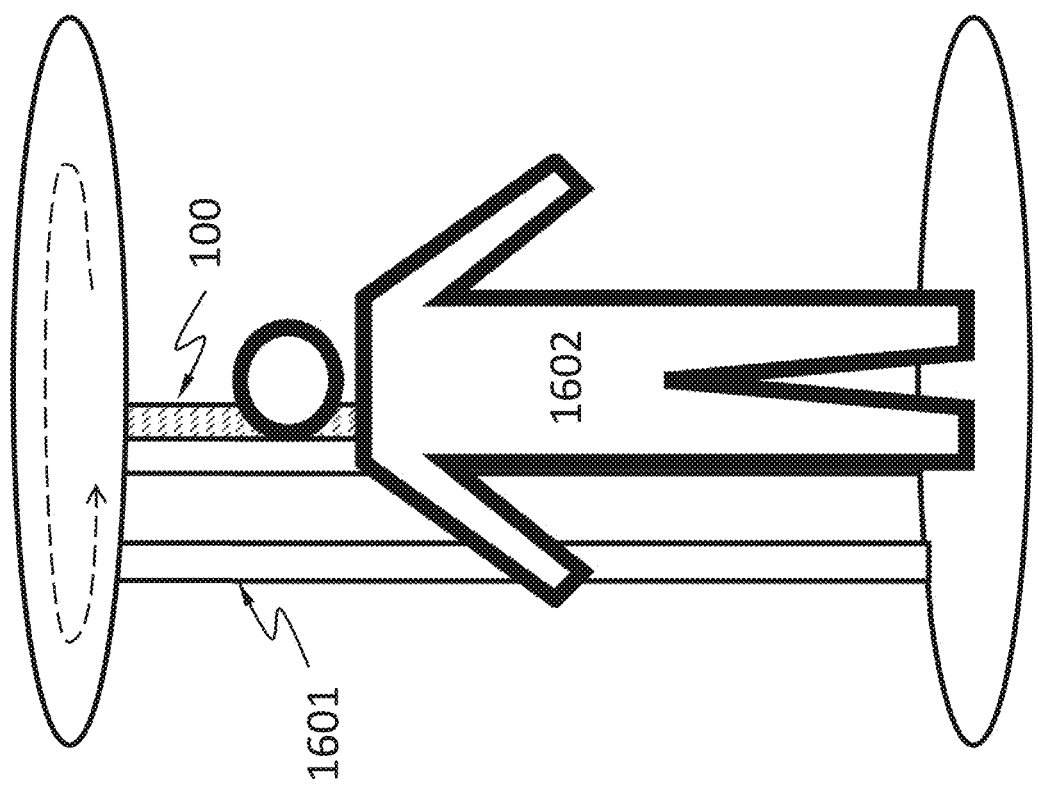
FIG. 10 schematically shows a full-body scanner system comprising the semiconductor X-ray detector described herein, according to an embodiment.

FIG. 10 schematically shows a full-body scanner system comprising the semiconductor X-ray detector 100 described herein. The full-body scanner system may detect objects on a person's body for security screening purposes, without physically removing clothes or making physical contact. The full-body scanner system may be able to detect non-metal objects. The full-body scanner system comprises an X-ray source 1601. X-ray emitted from the X-ray source 1601 may backscatter from a human 1602 being screened and objects thereon, and be projected to the semiconductor X-ray detector 100. The objects and the human body may backscatter X-ray differently. The semiconductor X-ray detector 100 forms an image by detecting the intensity distribution of the backscattered X-ray. The semiconductor X-ray detector 100 and the X-ray source 1601 may be configured to scan the human in a linear or rotational direction.

Figure 11:
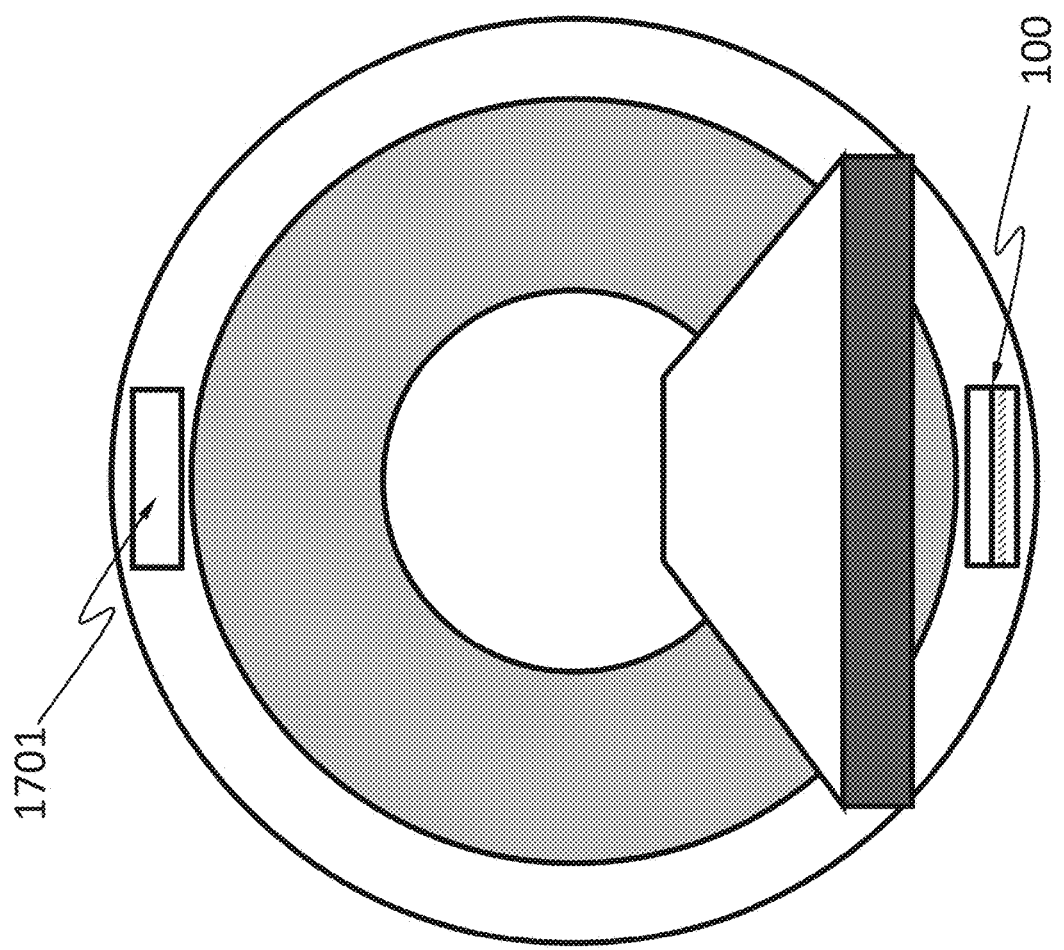
FIG. 11 schematically shows an X-ray computed tomography (X-ray CT) system comprising a semiconductor X-ray detector described herein, according to an embodiment.

FIG. 11 schematically shows an X-ray computed tomography (X-ray CT) system comprising the semiconductor X-ray detector 100 described herein. The X-ray CT system uses computer-processed X-rays to produce tomographic images (virtual "slices") of specific areas of a scanned object. The tomographic images may be used for diagnostic and therapeutic purposes in various medical disciplines, or for flaw detection, failure analysis, metrology, assembly analysis and reverse engineering. The X-ray CT system comprises the semiconductor X-ray detector 100 described herein and an X-ray source 1701. The semiconductor X-ray detector 100 and the X-ray source 1701 may be configured to rotate synchronously along one or more circular or spiral paths.

Figure 12:
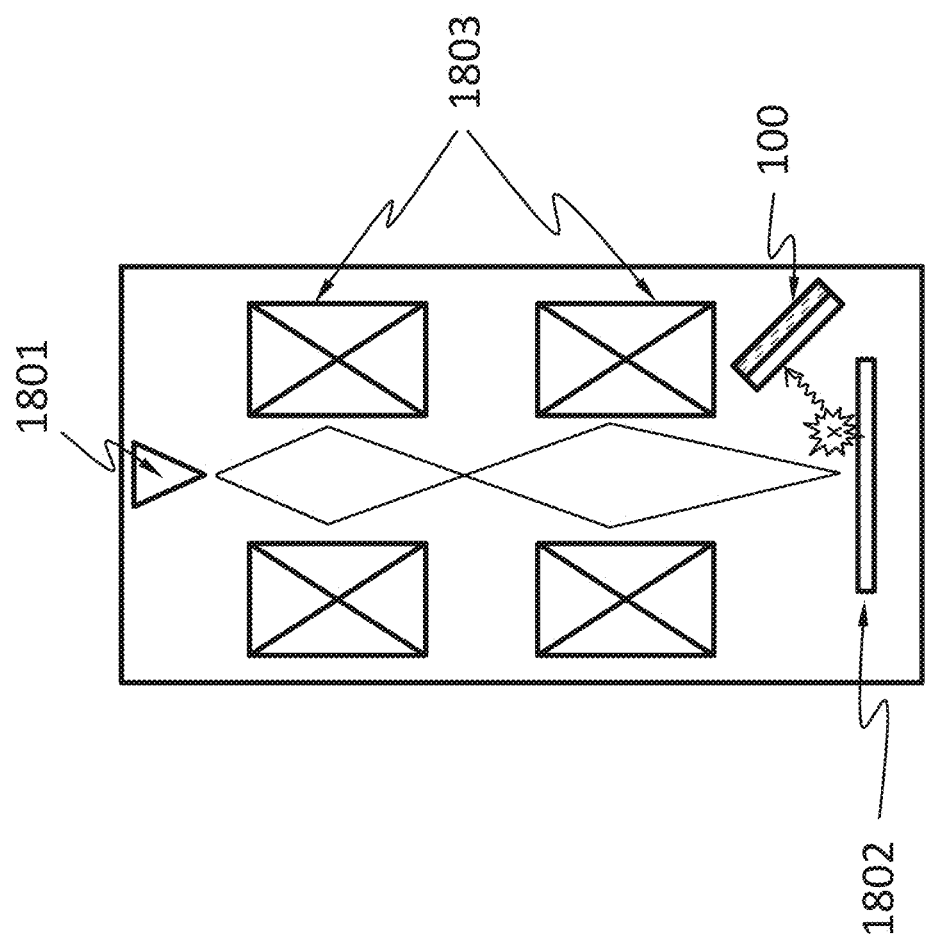
FIG. 12 schematically shows an electron microscope comprising the semiconductor X-ray detector described herein, according to an embodiment.

FIG. 12 schematically shows an electron microscope comprising the semiconductor X-ray detector 100 described herein. The electron microscope comprises an electron source 1801 (also called an electron gun) that is configured to emit electrons. The electron source 1801 may have various emission mechanisms such as thermionic, photo-cathode, cold emission, or plasmas source. The emitted electrons pass through an electronic optical system 1803, which may be configured to shape, accelerate, or focus the electrons. The electrons then reach a sample 1802 and an image detector may form an image therefrom. The electron microscope may comprise the semiconductor X-ray detector 100 described herein, for performing energy-dispersive X-ray spectroscopy (EDS). EDS is an analytical technique used for the elemental analysis or chemical characterization of a sample. When the electrons incident on a sample, they cause emission of characteristic X-rays from the sample. The incident electrons may excite an electron in an inner shell of an atom in the sample, ejecting it from the shell while creating an electron hole where the electron was. An electron from an outer, higher-energy shell then fills the hole, and the difference in energy between the higher-energy shell and the lower energy shell may be released in the form of an X-ray. The number and energy of the X-rays emitted from the sample can be measured by the semiconductor X-ray detector 100.

FIG. 13 schematically shows a radiation dose meter comprising the semiconductor X-ray detector 100 described herein. The radiation dose meter is capable of measuring an average dose rate of a radiation, e.g. X-ray, from a radiation source 1901. The radiation source 1901 may be a volcano 1910 or an atom bomb explosion. The radiation dose meter may include a chamber 1902 that includes air or other gas. X-ray going through a gas will ionize it, producing positive ions and free electrons. An incoming photon will create a number of such ion pairs proportional to its energy. An X-ray detector associated with the radiation dose meter can measure the average dose rate over the gas volume or the number of interacting photons. While the X-ray detector in the non-image application is usually a single pixel detector, the X-ray detector 100 having a plurality of pixels described herein can also be utilized with the capability of eliminating charge sharing that may occur on neighboring pixels.

Figure 14:
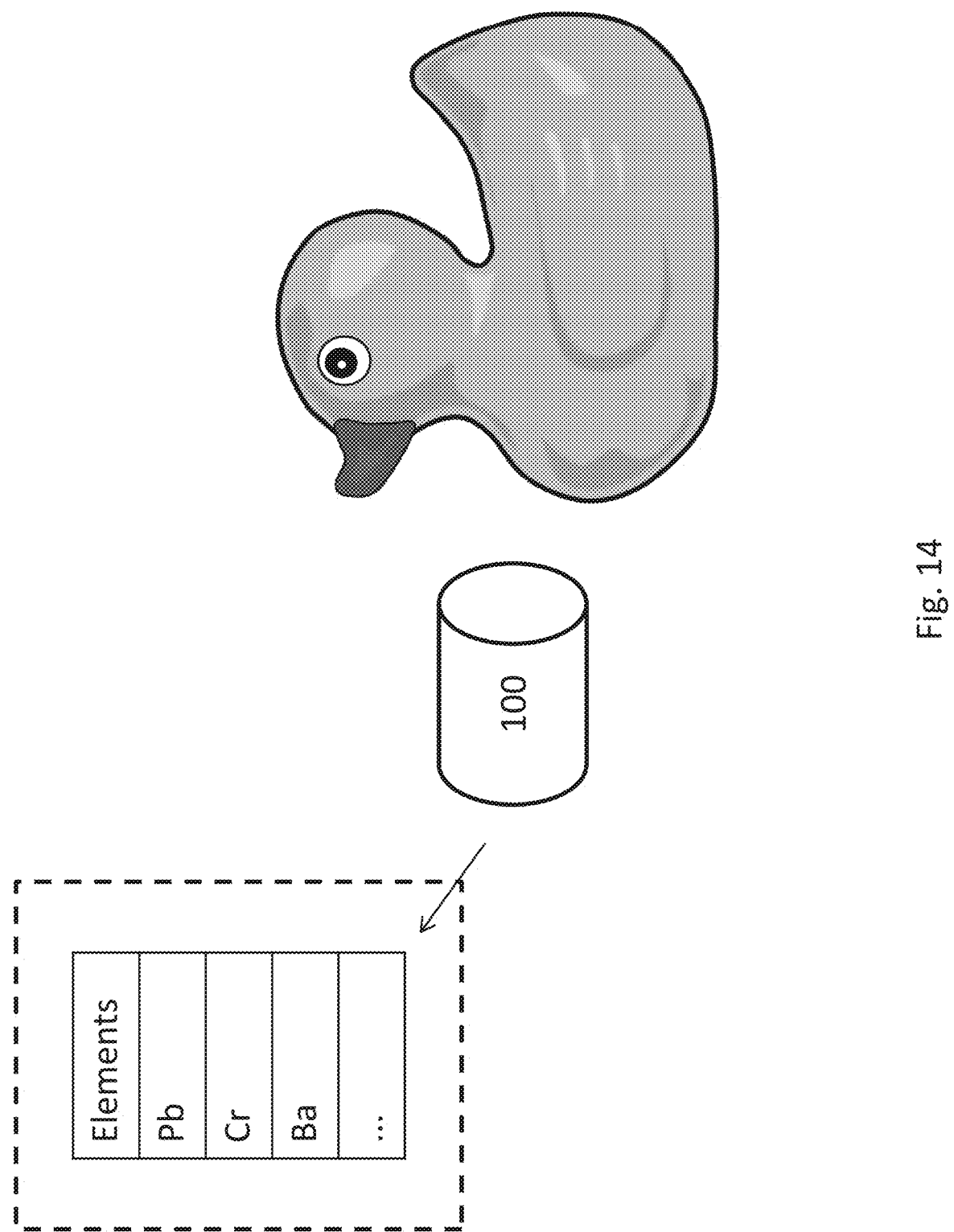
FIG. 14 schematically shows an element analyzer, according to an embodiment.

FIG. 14 schematically shows an element analyzer comprising the semiconductor X-ray detector 100 described herein. The element analyzer measurer is capable of detecting presence of one or more elements of interest on an object such as a toy. A high-energy beam of charged particles such as electrons or photos, or a beam of X-rays, is directed onto the object. Atoms of the objects are excited and emit X-ray at specific wavelengths that are characteristic of the elements. The X-ray detector 100 receives the emitted X-ray and determines the presence of the elements based on the energy of the emitted X-ray. For example, the X-ray detector 100 may be configured to detect X-ray at wavelengths Pb would emit. If the X-ray detector 100 actually receives X-ray from the object at these wavelengths, it can tell that Pb is present. The semiconductor X-ray detector 100 described here may have other applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this semiconductor X-ray detector 100 in place of a photographic plate, a photographic film, a PSP plate, an X-ray image intensifier, a scintillator, or another semiconductor X-ray detector.

FIG. 15 schematically shows a phase-contrast X-ray imaging (PCI) system 1500, according to an embodiment. In an embodiment, the PCI system 1500 may include the semiconductor X-ray detector 100 and a second semiconductor X-ray detector 100' spaced apart by a spacer 1510.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus suitable for detecting X-ray, comprising:
    an X-ray absorption layer comprising:
        a pixel,
        a layer of material or vacuum extending across a thickness of the X-ray absorption layer and encircling the pixel, wherein the layer of material or vacuum is configured to prevent a charge carrier in the pixel from entering a neighboring pixel of the pixel.

2. The apparatus of claim 1, wherein the layer of material is a layer of an electrically insulating material.

3. The apparatus of claim 1, wherein the layer of material is a layer of a gas.

4. The apparatus of claim 1, wherein the layer of material comprises a heavily doped semiconductor.

5. The apparatus of claim 1, wherein the apparatus comprises an array of pixels.

6. A system comprising the apparatus of claim 1 and an X-ray source, wherein the system is configured for performing X-ray radiography on human chest or abdomen.

7. A system comprising the apparatus of claim 1 and an X-ray source, wherein the system is configured for performing X-ray radiography on human mouth.

8. A cargo scanning or non-intrusive inspection (NII) system, comprising the apparatus of claim 1 and an X-ray source, wherein the cargo scanning or non-intrusive inspection (NII) system is configured for forming an image based on backscattered X-ray.

9. A cargo scanning or non-intrusive inspection (NII) system, comprising the apparatus of claim 1 and an X-ray source, wherein the cargo scanning or non-intrusive inspection (NII) system is configured for forming an image based on X-ray transmitted through an object inspected.

10. A full-body scanner system comprising the apparatus of claim 1 and an X-ray source.

11. An X-ray computed tomography (X-ray CT) system comprising the apparatus of claim 1 and an X-ray source.

12. An electron microscope comprising the apparatus of claim 1, an electron source and an electronic optical system.

13. A system comprising the apparatus of claim 1, wherein the system is configured for measuring dose of an X-ray source.

14. A system comprising the apparatus of claim 1, wherein the system is an X-ray telescope, or an X-ray microscopy, or wherein the system is configured for performing mammography, industrial defect detection, microradiography, casting inspection, weld inspection, or digital subtraction angiography.

15. A system suitable for phase-contrast X-ray imaging (PCI), the system comprising:
    the apparatus of claim 1;
    a second X-ray detector; and
    a spacer, wherein the apparatus and the second X-ray detector are spaced apart by the spacer.

16. The system of claim 15, wherein the apparatus and the second X-ray detector are configured for respectively capturing an image of an object simultaneously.

17. The system of claim 15, wherein the second X-ray detector is identical to the apparatus.

18. A system suitable for phase-contrast X-ray imaging (PCI), the system comprising the apparatus of claim 1, wherein the apparatus is configured for moving to and capturing images of an object exposed to incident X-ray at different distances from the object.

19. The apparatus of claim 1, wherein the pixel comprises a column of a semiconductor configured to absorb X-ray.

* * * * *